(12) United States Patent
Greene et al.

(10) Patent No.: US 6,843,832 B2
(45) Date of Patent: Jan. 18, 2005

(54) COMPOUND/CURVILINEAR IMMISCIBLE LIQUID SEPARATOR APPARATUS AND METHOD

(76) Inventors: Boyd B. Greene, 8452 Tilvern Ct., Germantown, TN (US) 38139; Helen C. Greene, 8452 Tilvern Ct., Germantown, TN (US) 38139

(*) Notice: Subject to any disclaimer, the term of this patent is extended or adjusted under 35 U.S.C. 154(b) by 207 days.

(21) Appl. No.: 10/166,369

(22) Filed: Jun. 11, 2002

(65) Prior Publication Data

US 2002/0194992 A1 Dec. 26, 2002

Related U.S. Application Data

(60) Provisional application No. 60/297,756, filed on Jun. 14, 2001.

(51) Int. Cl.$^7$ .............................................. B01D 19/00
(52) U.S. Cl. ............................ 95/249; 95/252; 95/253; 95/254; 95/261; 96/183; 96/185; 96/209; 96/212; 96/216; 210/188; 210/512.1; 210/788
(58) Field of Search ................................ 210/188, 787, 210/788, 512.1; 95/254, 253, 263, 293, 248, 249, 251, 252, 261, 260; 96/202, 183, 185, 195, 208, 209, 212, 216

(56) References Cited

U.S. PATENT DOCUMENTS

| | | | |
|---|---|---|---|
| 689,366 A | | 12/1901 | Newbold et al. |
| 1,970,783 A | * | 8/1934 | Walker |
| 1,970,784 A | | 8/1934 | Walker |
| 2,084,958 A | * | 6/1937 | Hunter |
| 2,751,998 A | | 6/1956 | Glasgow |
| 2,808,123 A | | 10/1957 | Walker |
| 2,863,522 A | | 12/1958 | Smith |
| 2,942,689 A | | 6/1960 | Walker et al. |
| 2,971,604 A | | 2/1961 | Lowery |
| 3,064,410 A | | 11/1962 | Wright |
| 3,399,135 A | | 8/1968 | Conley, Jr. et al. |
| 3,555,820 A | * | 1/1971 | Cramer et al. |
| 3,766,720 A | * | 10/1973 | Bloom |
| 3,813,851 A | | 6/1974 | Eder |
| 3,957,656 A | | 5/1976 | Castelli |
| 4,072,481 A | | 2/1978 | Laval, Jr. |
| 4,278,545 A | | 7/1981 | Batutis et al. |
| 4,278,550 A | * | 7/1981 | Watts |
| 4,345,920 A | * | 8/1982 | Ross |
| 4,390,351 A | * | 6/1983 | Matsui et al. |
| 4,425,239 A | * | 1/1984 | Jacocks et al. |
| 4,622,132 A | * | 11/1986 | Chupka |
| 4,732,585 A | | 3/1988 | Lerner |
| 5,149,344 A | | 9/1992 | Macy |
| 5,240,595 A | * | 8/1993 | Lamarre |
| 5,266,191 A | | 11/1993 | Greene et al. |
| 5,314,529 A | * | 5/1994 | Tilton et al. |
| 5,334,239 A | | 8/1994 | Choe et al. |
| 5,500,039 A | | 3/1996 | Mori et al. |

(List continued on next page.)

Primary Examiner—Duane S. Smith
(74) Attorney, Agent, or Firm—Richard C. Littman

(57) ABSTRACT

The compound/curvilinear immiscible liquid separator has a separator section with an outer, elongated, cylindrical shell aligned vertically opening into an upper transition section and vapor dome at the top and a lower transition section and solid/heavy crude containment section at the bottom. A center column is disposed in the axial center of the separator section and a plurality of serially connected curved plates are disposed between the outer shell and center column to define an elongated curvilinear flow path having reverse flow pathways. An oil-water-gas mixture is introduced into the separator section under pressure past heating coils and through the curvilinear path, the lighter density oil entering and being removed from the top of the center column, and heavier sludge and brine collecting in the containment section. Gases bubble up through the center column and are removed from the vapor dome.

14 Claims, 20 Drawing Sheets

U.S. PATENT DOCUMENTS

| | | | |
|---|---|---|---|
| 5,535,595 A | * | 7/1996 | Manz |
| 5,565,101 A | * | 10/1996 | Kuntz |
| 5,575,909 A | * | 11/1996 | Foster |
| 5,698,102 A | | 12/1997 | Khudenko |
| 5,827,357 A | | 10/1998 | Farion |
| 5,900,149 A | * | 5/1999 | Bradford |
| 6,171,465 B1 | | 1/2001 | Compton |
| 6,187,079 B1 | | 2/2001 | Bridger |
| 2002/0194992 A1 | * | 12/2002 | Greene et al. |
| 2003/0154860 A1 | * | 8/2003 | Milla |

* cited by examiner

COMPOUND/CURVILINEAR IMMISCIBLE LIQUID SEPARATOR APPARATUS AND METHOD

CROSS-REFERENCE TO RELATED APPLICATION

This application claims the benefit of U.S. Provisional Patent Application Ser. No. 60/297,756, filed Jun. 14, 2001.

BACKGROUND OF THE INVENTION

1. Field of the Invention

The present invention relates to a curvilinear compound separator apparatus and method for separating multiple immiscible liquids, gases, and rigid particles of varying densities from liquid mixtures that are in motion within a temperature and pressure controlled environment. This unique device and method utilizes the particle kinetic energy within a moving stream and the interaction of these particles within the controlled flow pathway to separate immiscible substances. The principles of particle dynamics (forces of buoyancy, weight, drag, and particle translation with respect to the time within the controlled environment (time dependent motion)) are applied to cause the accelerated movement and separation of immiscible particles.

2. Description of Related Art

It is desired to find an effective way to recover petroleum products from brine. In particular, in the field of crude oil production, it is required to have an accelerated liquid/liquid and liquid/gas extraction to minimize the loss of crude oil and natural gas products. Specifically, this device will be applicable for constant flow, pressurized, and temperature regulated processes to increase the efficiency and recover at least 95% of currently lost marketable products. Current extraction and separation methods include: settlementation, which requires a prolonged period of holding the liquid in a quiescent state for a prolonged time; bed filters and inclined plate separators; membranes and filters; and electrostatic processes. The above processes require large storage facilities, which are extremely expensive and hazardous to operate, such as the electrostatic separation process.

The most common practice used in the industry today is phase extraction within a vessel that maintains liquid in a quiescent state, a practice which utilizes Stokes' Law. Stokes' Law relates the drag on a sphere to its velocity, as it moves in a quiescent liquid.

$$F_d = 3\pi(\mu u d_p),$$

where $\mu$=fluid viscosity

In order for Stokes' law to strictly apply, the fluid must be quiescent and non-moving, or at best, a "creeping flow" and the particles must be substantially rigid (non-deformable) spheres. In such a situation, there is no separation of liquid from the rear of the rising or falling sphere as it moves, and viscous effects dominate the particle's movement. In defining fluid movement, reference to the Reynolds Number (Re) is made. If the Reynolds rise number $R_o$ is greater than 0.1, the drag force F on the sphere cannot be predicted accurately.

$$\text{Reynolds Number} = \frac{du\rho}{\mu}, \text{Re} > 0.10$$

where:
$\rho$=density of continuous liquid phase
$\mu$=continuous liquid viscosity
u=relative velocity
d=particle diameter In fluid streams with particles immersed within the fluid, the internal flow dynamics of particles can be expressed, in general, as follows:

$$u_t = gd^2 \frac{(\rho_p - \rho_1)}{18\mu}$$

where:
$\rho_p$=density of carrying liquid
$\rho_1$=density of particle or carried liquid The equation above will apply to the movement of an oil particle within another liquid, such as water, in a quiescent state. This equation expresses the dynamic force on a sphere of diameter d moving with a speed u through a fluid, such as water, that has a viscosity $\mu$. An oil particle naturally tends to rise due to the buoyant forces being greater than gravity and drag forces, because its density, $\rho_p$, is lower than the density, $\rho_1$, of water. The oil particle movement, relative to the continuous fluid can be expressed as a function of Reynolds Number where d is the diameter of the spherical oil particle.

The aforementioned theory applies to small oil particles in the range of ten to twenty microns in diameter and below, which are the hardest particles to remove. Larger diameter liquid spheres will have higher terminal velocities than that predicted by Stokes' Law due to internal liquid circulation within the spheres in a manner well-known to those skilled in the art. Liquid within larger spheres at the interface between the sphere and the surrounding fluid will tend to move along with the surrounding fluid flow and re-circulate back along the axis of the sphere, thereby reducing drag forces at the boundary interface of the sphere. As the spheres become even larger, they tend to deform into an "inverted teardrop" shape" further reducing the drag forces because of the more aerodynamic shape of the deformed particle. Small oil particles, due to their substantially rigid spheres without appreciable deformation or internal circulation, are therefore the hardest particles to remove.

When the rate of the movement of a mixture within an apparatus exceeds a certain critical value, which is dependent on the physical characteristics of the fluid and the Pathways, the flow of the mixture enters the turbulent region of fluid flow. This turbulence within fluid flow renders Stokes' law inapplicable. A measure of the turbulence within a channel of flowing fluid, such as an oil-water mixture, is given by the Reynolds number (Re) for the channel, defined by the well-known relationship $$\text{Re} = \rho V \frac{D}{\mu}$$

where D is the "hydraulic diameter" of a Pathway (channel) and V is the average velocity of the fluid through the channel. If Re is less than 2,000 for water, the flow is completely laminar and non-turbulent. If Re is greater than 2,000 for water, the flow becomes undefined, and enters into a transition region that has some turbulence and is somewhat non-laminar. The higher the Reynolds numbers, the more turbulent the flow becomes. As the viscosity becomes greater, i.e. oils, Re will be reduced by a factor of the ratio of viscosity of water to viscosity of oil, $\mu$. Therefore, Reynolds number greater than 2,000 for oils will remain laminar.

Technologies used on the market today do not address the inapplicability of Stokes' law to a moving flow of water. Such incomplete solutions to the oil-water separation problem yield less than optimal removal of oil from the oil-water mixture. Other approaches employing various filters and the like have a known tendency to clog and become blocked with sediment and are very costly to operate. Mechanical separating systems use mechanical devices such as centrifuges for primary separation. This kind of system is very costly to maintain and operate. Likewise, an electrostatic system's use of high impressed voltage across plate anodes to cause ionic changes for particle agglomeration requires high energy levels, and is hazardous when vapors occur.

The present application exploits the properties of oil and water as two immiscible liquids of differing density. The methods disclosed are applicable to mixtures of any immiscible liquids of different density (buoyancy). For separating particles of one liquid from another within a fluid mixture, it is required to control the liquid environment to prevent uncontrolled turbulence and Pathway clogging to improve efficiency. The apparatus should depend upon the kinetic fluid energy, thermal gradient, and nucleation to cause separation.

Several devices have been developed which perform solid-liquid, liquid-gas, or liquid-liquid separations to some degree in various applications. U.S. Pat. No. 689,366, issued Dec. 17, 1901 to Newbold et al., shows a device which separates gas from an oil-water mixture, but is not designed to separate oil from water. U.S. Pat. No. 1,970,784, issued Aug. 21, 1934 to J. P. Walker, discloses a device for separating an oil-gas mixture from water at well pressure which uses an uncontrolled whirling action in a cylindrical tank but without laminar flow, relying on gravity to separate the oil-gas mix from water.

U.S. Pat. No. 3,064,410, issued Nov. 20, 1962 to H. H. Wright, shows a separator which uses a plurality of baffles for separating oil well fluids. U.S. Pat. No. 3,399,135, issued Aug. 27, 1968 to Conley, Jr. et al., describes a device for the treatment of sewage having a horizontally oriented tank with a plurality of linear tubes which slope slightly upward in the direction of fluid flow. U.S. Pat. No. 3,813,851, issued Jun. 4, 1974 to T. Eder, teaches a separator having a vertical tank in a parallelepiped shape with internal plates or baffles secured to opposite walls of the tank in a zigzag fashion, with one layer of plates being offset from the next succeeding layer so that liquid flow is split between the two.

U.S. Pat. No. 3,957,656, issued May 18, 1976 to J. L. Castelli, describes a separator for oil-brine separation having a tank with corrugated or sine wave shaped top and bottom plates which are oscillated to accelerate or decelerate horizontal flow to cause oil particles to coalesce. U.S. Pat. No. 4,278,545, issued Jul. 14, 1981 to Batutis et al., shows a similar device with the corrugated plates stacked vertically and parallel to the direction of flow.

U.S. Pat. No. 4,072,481, issued Feb. 7, 1978 to C. C. Laval, Jr., teaches a device which separates fluids to protect a pump having an elongated tube with a shorter, concentric "vortex" tube disposed inside, separation being accomplished by gravity and by uncontrolled swirling around the vortex tube. U.S. Pat. No. 4,732,585, issued Mar. 22, 1988 to B. J. Lerner, discloses a separating device having a plurality of staggered rows of cylinders with partition walls arranged parallel to the direction of fluid flow to prevent diagonal flow through the staggered elements.

U.S. Pat. No. 5,149,344, issued Sep. 22, 1992 to D. H. Macy, shows a two tank apparatus for separating an oil-gas-water mixture in which gases are removed in the first tank, and oil and water are separated in the second, lower level tank, the apparatus having a buoyant valve to control fluid level in the lower tank to keep the tank full in order to avoid sloshing in the tank caused by movement of the tanks, such as movement of the tanks in marine or offshore drilling operations. U.S. Pat. No. 6,187,079, issued Feb. 13, 2001 to P. J. Bridger, addresses the same problem and provides horizontal tanks with anti-foaming media and demisting media, and perforated plates for flow restriction.

U.S. Pat. No. 5,334,239, issued Aug. 2, 1994 to Choe et al., teaches a device for separating gas from liquid under microgravity conditions, such as those encountered in outer space. U.S. Pat. No. 5,500,039, issued Mar. 19, 1996 to Mori et al., describes a liquid gas separator for electric plants (a water-steam mixture), in which the separator has a restricted outlet through a perforated plate or a diverter to lengthen the outflow time and allow more time for separation. U.S. Pat. No. 5,698,102, issued Dec. 16, 1997 to B. M. Khudenko, shows various forms of a lamellar separator for separating a solid-liquid-gas mixture in wastewater or biomass systems.

U.S. Pat. No. 5,827,357, issued Oct. 27, 1998 to R. R. Farion, describes a device for separating drilling fluids (water or diesel fluid with nitrogen and rock cuttings) with a vertical tank having a plurality of vortex tubes centrally located and upper and lower chambers above and below the tubes. Incoming fluid is split between the tubes and enters each tube tangentially, gases exiting the top of the vortex tubes, and liquid and solid matter exiting the bottom of the vortex tubes, where they separate by gravity.

A prior patent issued to one of the present applicants, U.S. Pat. No. 5,266,191, issued Nov. 30, 1993 to Greene et al., teaches an apparatus and method for separating oil from water in such applications as parking lot runoff, etc., which uses a horizontally disposed cylindrical tank with weirs at the inlet and outlet and a serpentine fluid flow path defined by serially joined divider plates.

None of the foregoing patents use a heating element to apply a thermal gradient. The following patents show devices with a heating element.

U.S. Pat. No. 2,751,998, issued Jun. 26, 1956 to C. O. Glasgow, describes a horizontally disposed tank with an inlet, an outlet, and a divider wall disposed therebetween extending down from the top wall of the tank but not all the way to the bottom, dividing the tank into heating and settling chambers. U.S. Pat. No. 2,808,123, issued Oct. 1, 1957 to J. P. Walker teaches a device for recovering hydrocarbon gases which uses well stream liquids in a condenser to cool hydrocarbon gases and return them to the tank.

U.S. Pat. No. 2,863,522, issued Dec. 9, 1958 to J. B. Smith, discloses an oil and gas treater which uses cooling from the release of gases as a heat exchange medium. U.S. Pat. No. 2,942,689, issued Jun. 28, 1960 to Walker et al., teaches a separator in which gases of selected molecular weight are reabsorbed in the denuded oil. U.S. Pat. No. 2,971,604, issued Feb. 14, 1961 to C. Lowery, describes a novel heater for a separation tank, some of the separation occurring before the mixture enters the tank. U.S. Pat. No. 6,171,465, issued Jan. 9, 2001 to B. E. Compton, discloses a desalting device which has a horizontal tube or tank with a vertical divider wall so that incoming fluid flows in and doubles back in order to extend flow time, with vertical baffles having spaced apart perforated regions for separating the flow of oil and water. A heater is applied to the flow after the free water has been removed.

None of the above inventions and patents, taken either singly or in combination, is seen to describe the instant invention as claimed.

SUMMARY OF THE INVENTION

The compound/curvilinear immiscible liquid separator has a separator section with an outer, elongated, cylindrical shell aligned vertically opening into an upper transition section and vapor dome at the top and a lower transition section and solid/heavy crude containment section at the bottom. A center column is disposed in the axial center of the separator section and a plurality of serially connected curved plates are disposed between the outer shell and center column to define an elongated curvilinear flow path having reverse flow pathways. An oil-water-gas mixture is introduced into the separator section under pressure past heating coils and through the curvilinear path, the lighter density oil entering and being removed from the top of the center column, and heavier sludge and brine collecting in the containment section. Gases bubble up through the center column and are removed from the vapor dome.

The oil-water-gas mixture separates during passage through the curvilinear pathway due to the centripetal, centrifugal, and rotational forces exerted on the immiscible fluids in a laminar flow pathway, which tend to throw immiscible particles of oil towards the lower velocity-lower energy regions adjacent the walls of the pathway, where the particles agglomerate by nucleation, separate, and rise above the brine water and heavy crude because of the lower density of oil, the elongated pathway providing sufficient time for separation to occur. Separation is aided by maintaining a temperature gradient between the separation section and the containment section, the containment section being maintained at a cooler temperature so that liquid convection aids lower density oil to rise to the top. Gas bubbles up the center column from the containment section, causing a "chimney effect" which exercises a synergistic effect in promoting nucleation of low density oil particles.

Liquid oil is removed from the top of the center column by an appropriate discharge pipe. The heavier crude and brine is removed through a sludge removal pipe from the bottom of the device.

The method of separating a liquid-liquid-gas mixture of immiscible fluids involves the steps of introducing the mixture of immiscible fluids into a separator apparatus under pressure, heating the mixture, forcing the mixture through an elongated curvilinear flow path which includes reverse flow paths in order to cause the lower density liquid to rise and the higher density liquid to fall, collecting the lower density fluid from the top of the separator, and draining the higher density fluid from the bottom of the separator. The method also comprises bubbling evolved gases through the mixture, collecting the evolved gases, and maintaining a temperature gradient between the upper and lower portions of the separator.

Accordingly, it is a principal object of the invention to provide a separator for separating a liquid-liquid-gas mixture of immiscible substances having increased efficiency for separating finely divided liquid particles, such as oil pumped from a well and mixed with brine water.

It is another object of the invention to apply centripetal, centrifugal, and rotational forces in a laminar flow of immiscible substances for increased efficiency in separating the substances.

It is a further object of the invention to provide a separator for immiscible fluids which uses a chimney effect provided by gases evolved during the separation to increase agglomeration of low density liquid particles by nucleation to improve the efficiency of the separation.

Still another object of the invention is to provide an improved device for separating immiscible fluids by regulating the temperature in upper and lower sections of the device in order to affect the density of the fluids in the sections, and to provide liquid convection for enabling a lower density fluid to rise to the upper section of the device.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
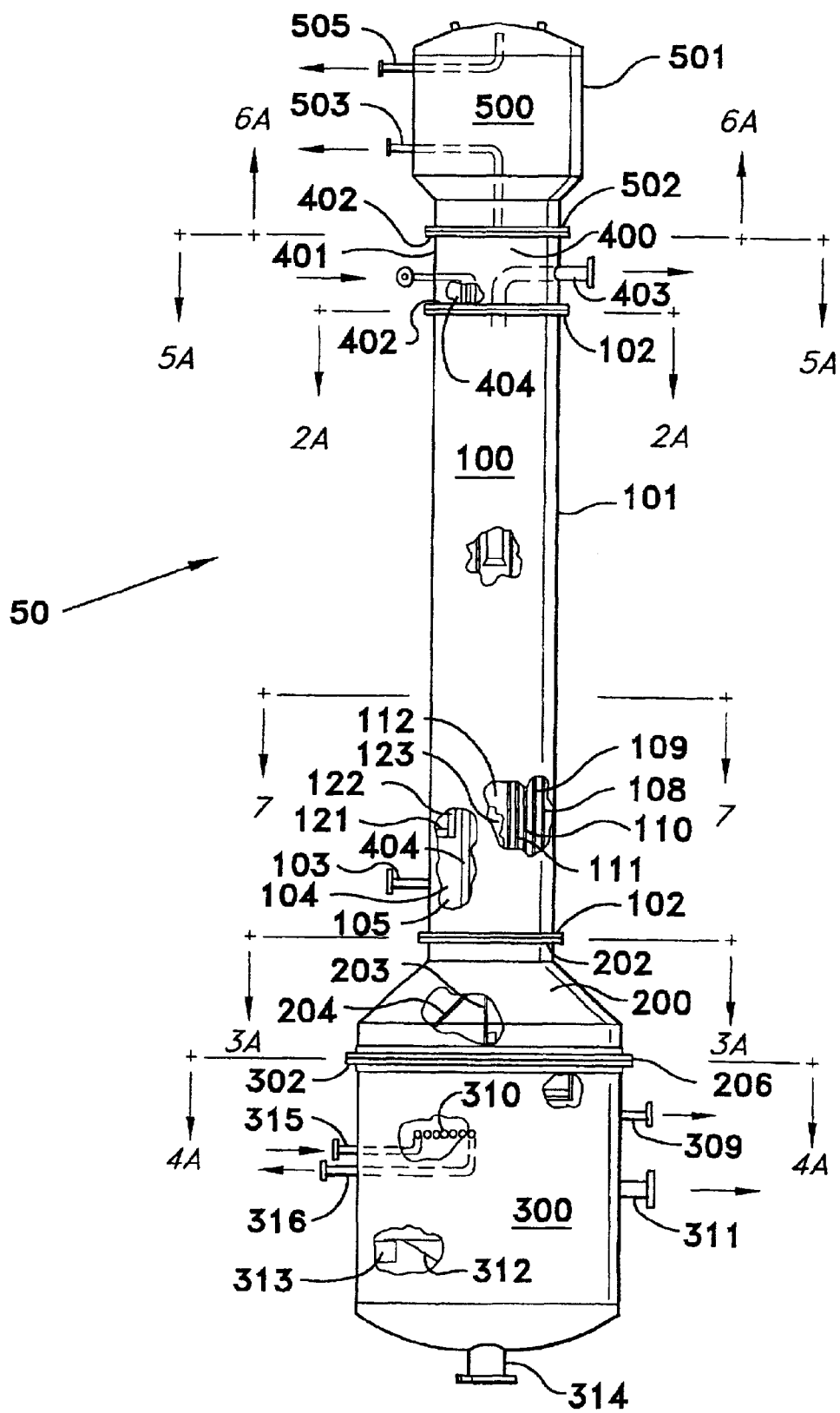
FIG. 1 is an elevation view of the compound/curvilinear immiscible liquid separator apparatus according to the present invention.

The present invention is a compound/curvilinear immiscible liquid separator, designated generally as 50 in FIG. 1. The device is designed to use known processes and methods involving particle dynamics, agglomeration kinetics, particle translation within a fluid, centrifugal and centripetal forces exerted on a particle of given mass moving in a curved plane, and circulatory fluid motions associated with temperature gradients and defined as convection flow. For the purpose of this description, the primary emphasis is on the separation of immiscible liquids of varying densities within a carrying fluid, the carrying fluid being water (brine water) with a specific gravity of 1.0 or greater at standard atmosphere conditions.

The device 50 shown in FIG. 1 is designed for constant pressurized operating conditions with temperature being controlled within different sections of this apparatus to accelerate immiscible liquid separation of liquid with different densities. Fluid flow through the apparatus 50 is maintained and controlled by pressure and flow regulating stations outside of this system. For the most part, pressure differentials between the inlet pressure and outlet pressure are about 0.5 to 1.5 psig. As can be seen from FIG. 1 and FIG. 2A, the separating section 100 is open on both upper and lower ends, and liquid stratification is totally dependent upon the relative densities of the liquid within the system.

Figure 2A:
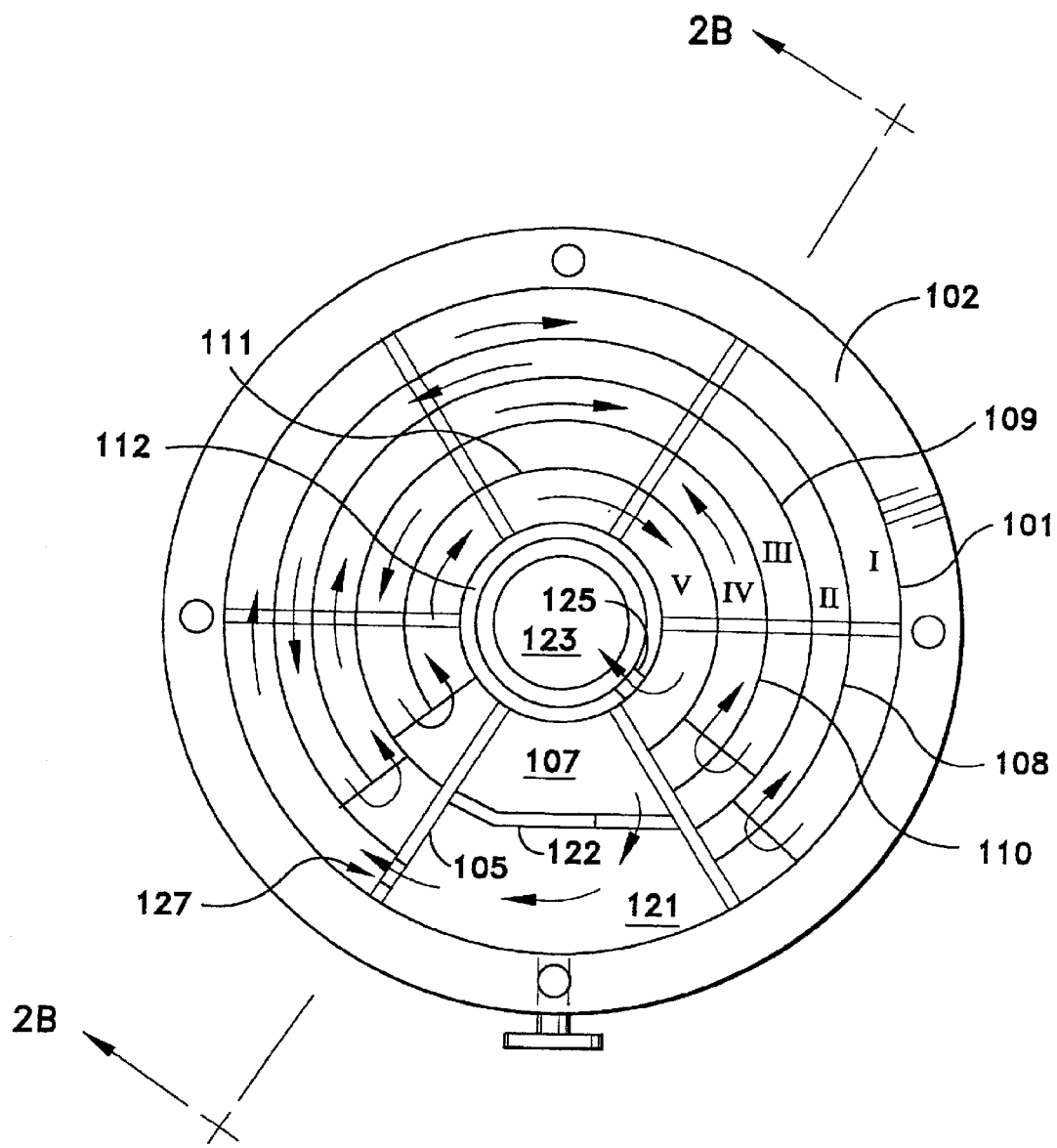
FIG. 2A is a top view of the separator section of the apparatus according to the present invention as viewed from lines 2A—2A of FIG. 1.
Figure 2B:
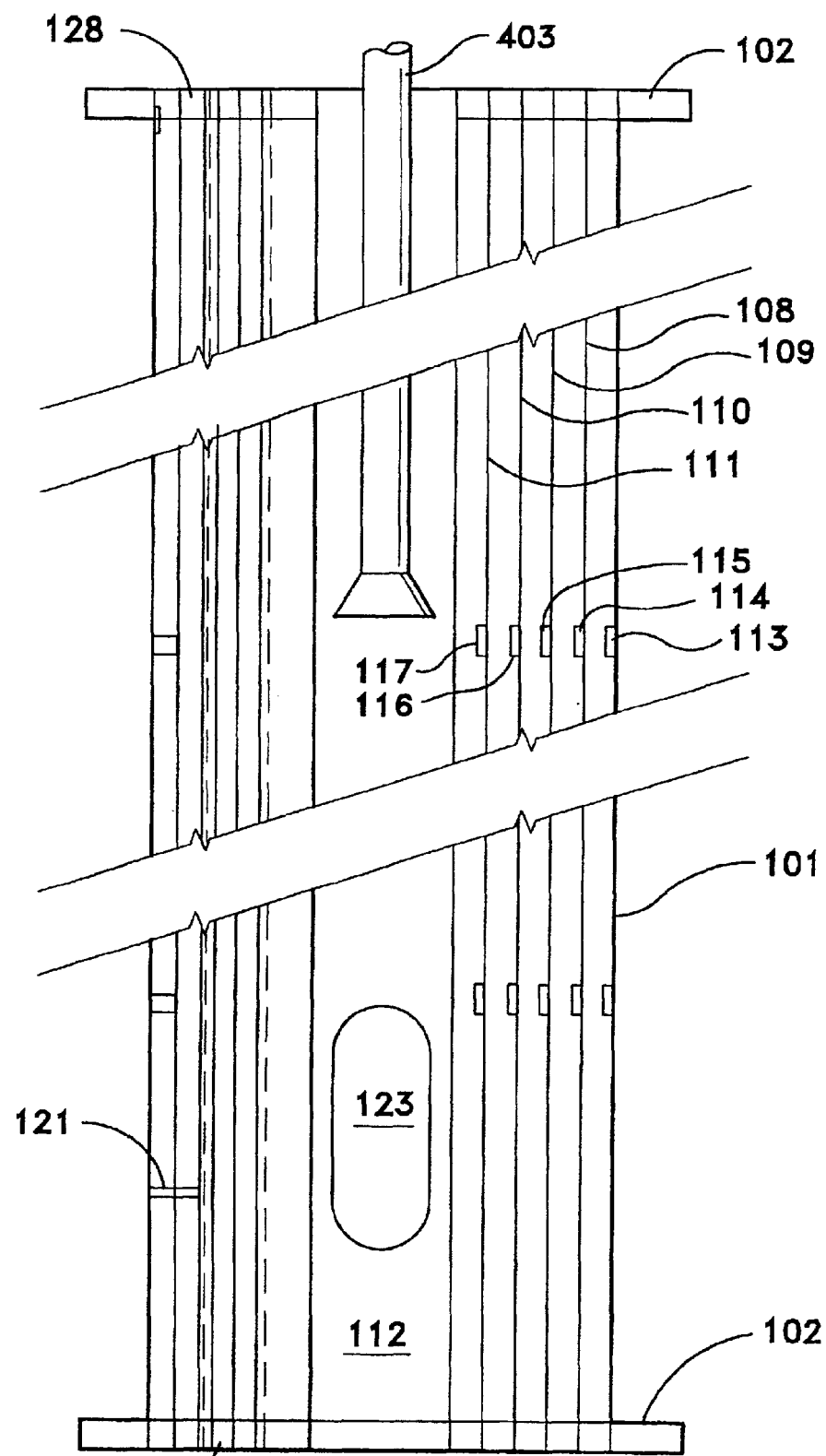
FIG. 2B is a section view along the lines 2B—2B of FIG. 2A.
Figure 3A:
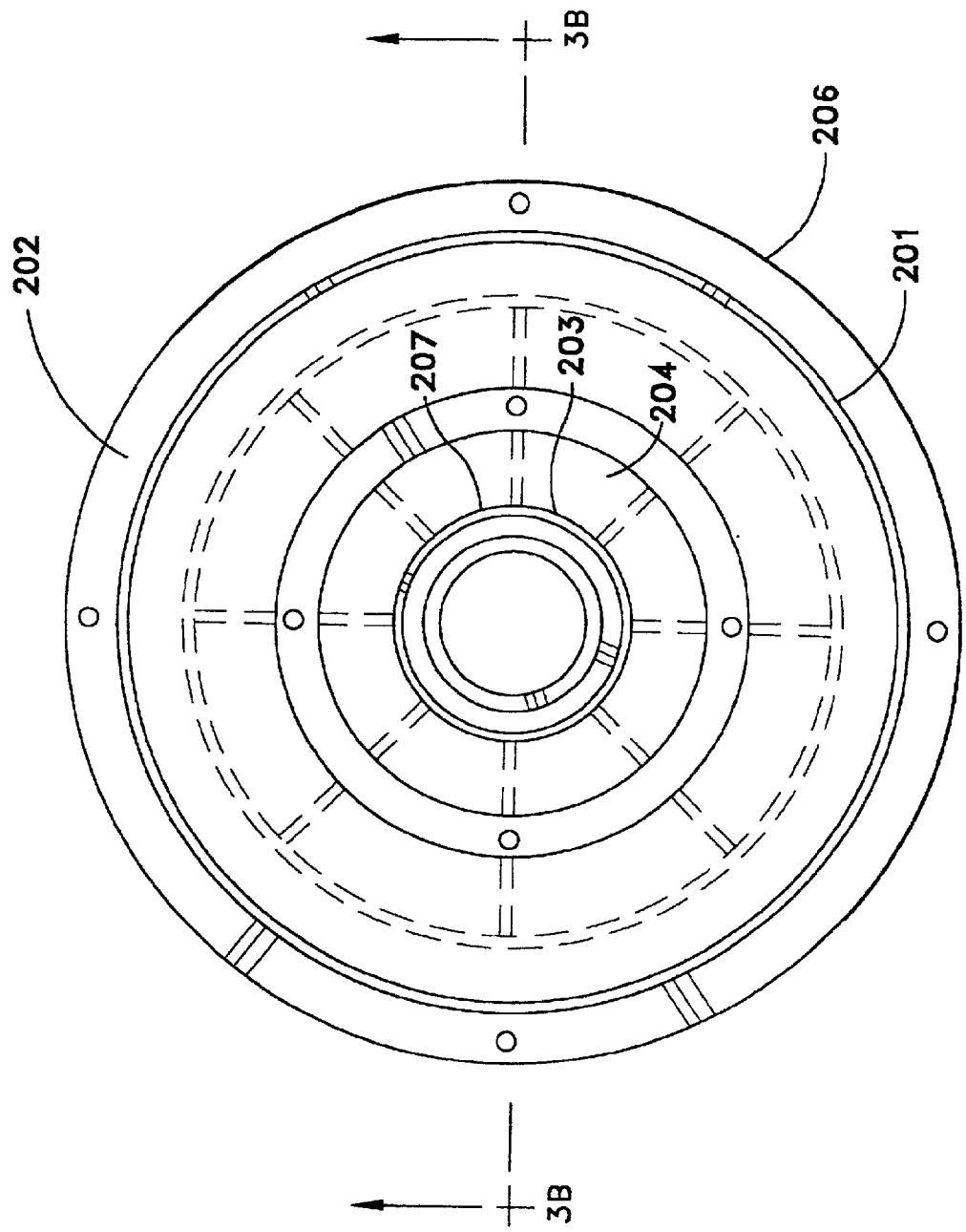
FIG. 3A is a top view of the lower transition section of the apparatus according to the present invention as viewed from lines 3A—3A of FIG. 1.
Figure 3B:
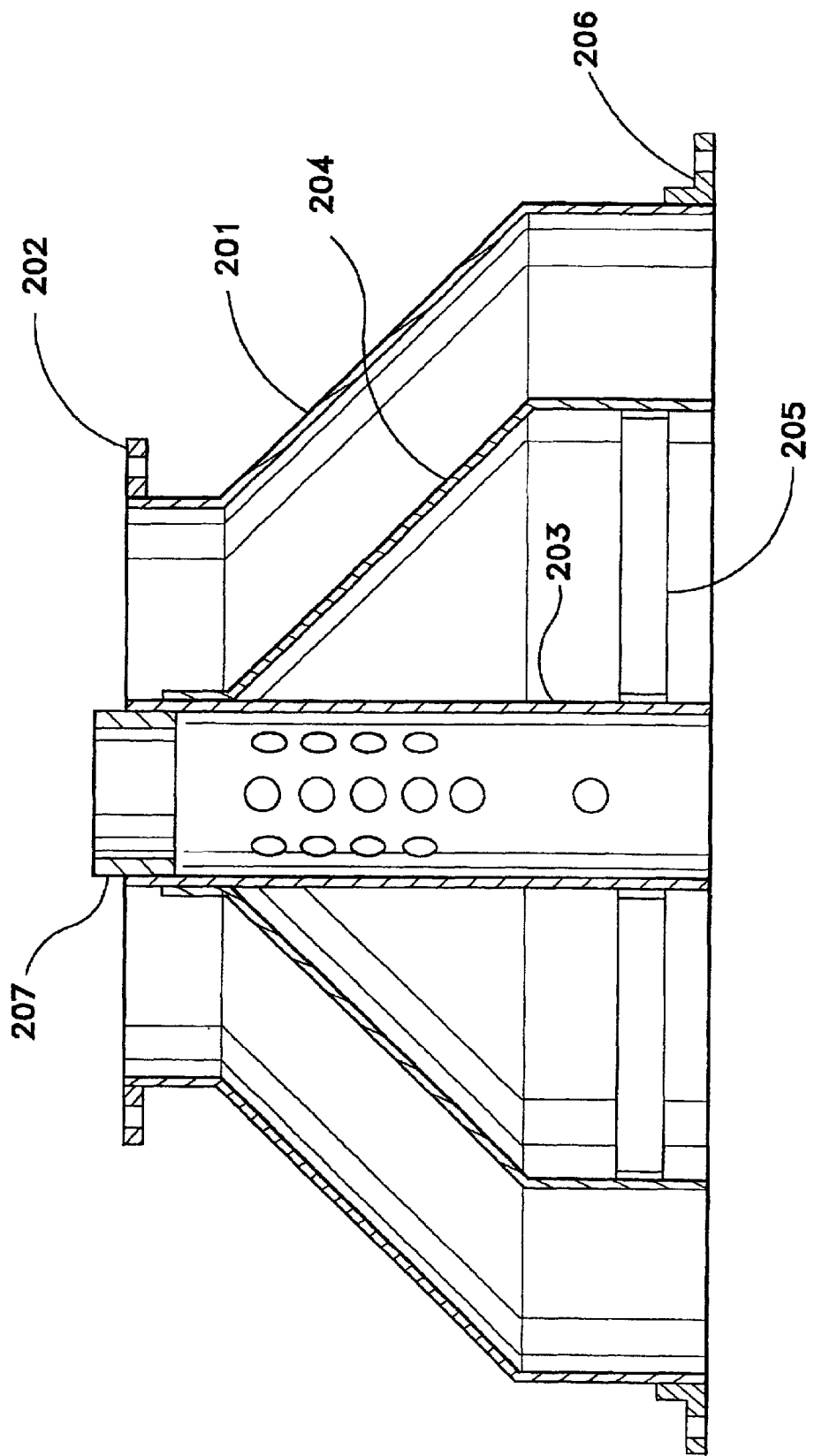
FIG. 3B is a section view along the lines 3B—3B of FIG. 3A.
Figure 4A:
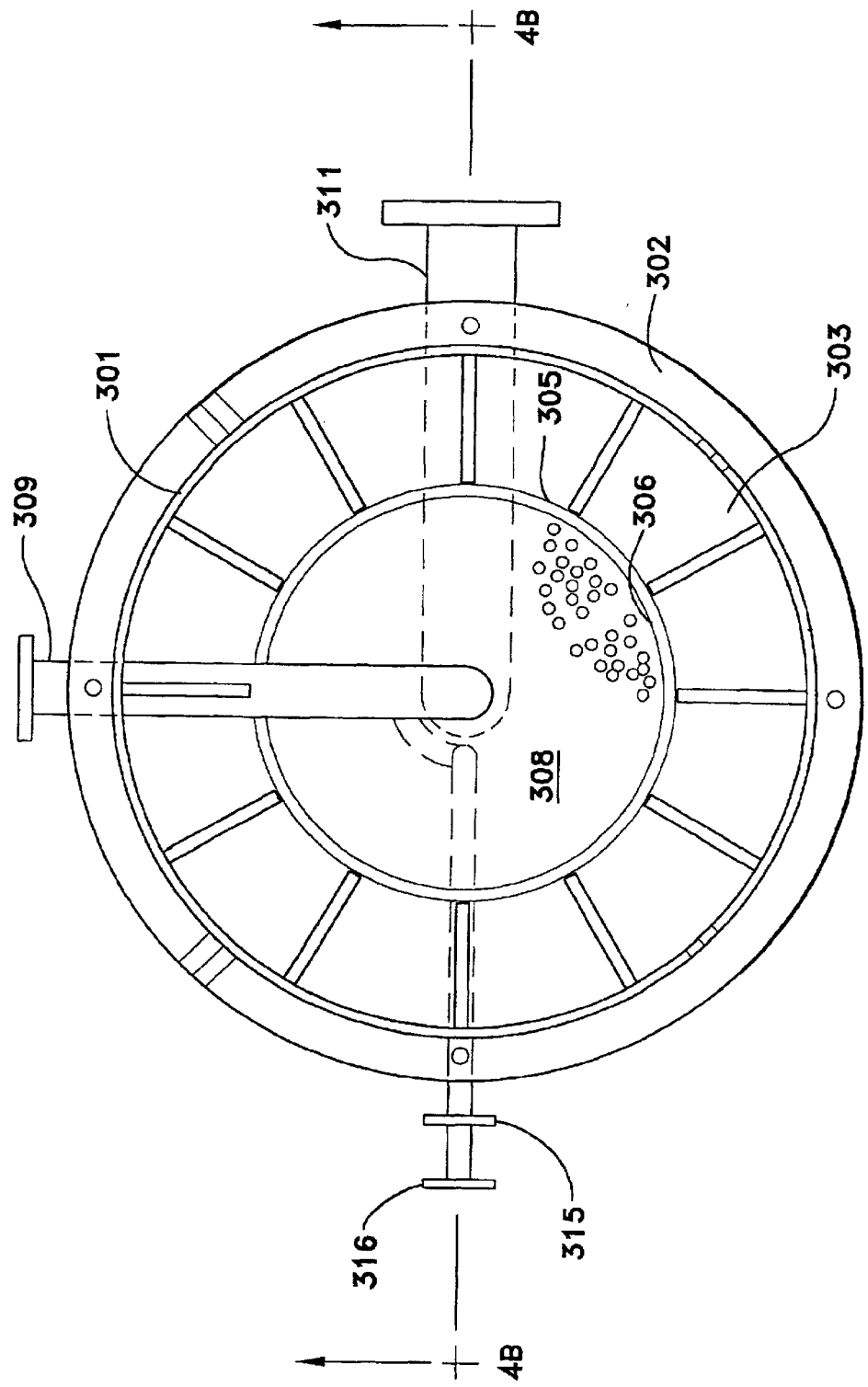
FIG. 4A is a top view of the heavy crude and solid containment section of the apparatus according to the present invention as viewed from lines 4A—4A of FIG. 1.
Figure 4B:
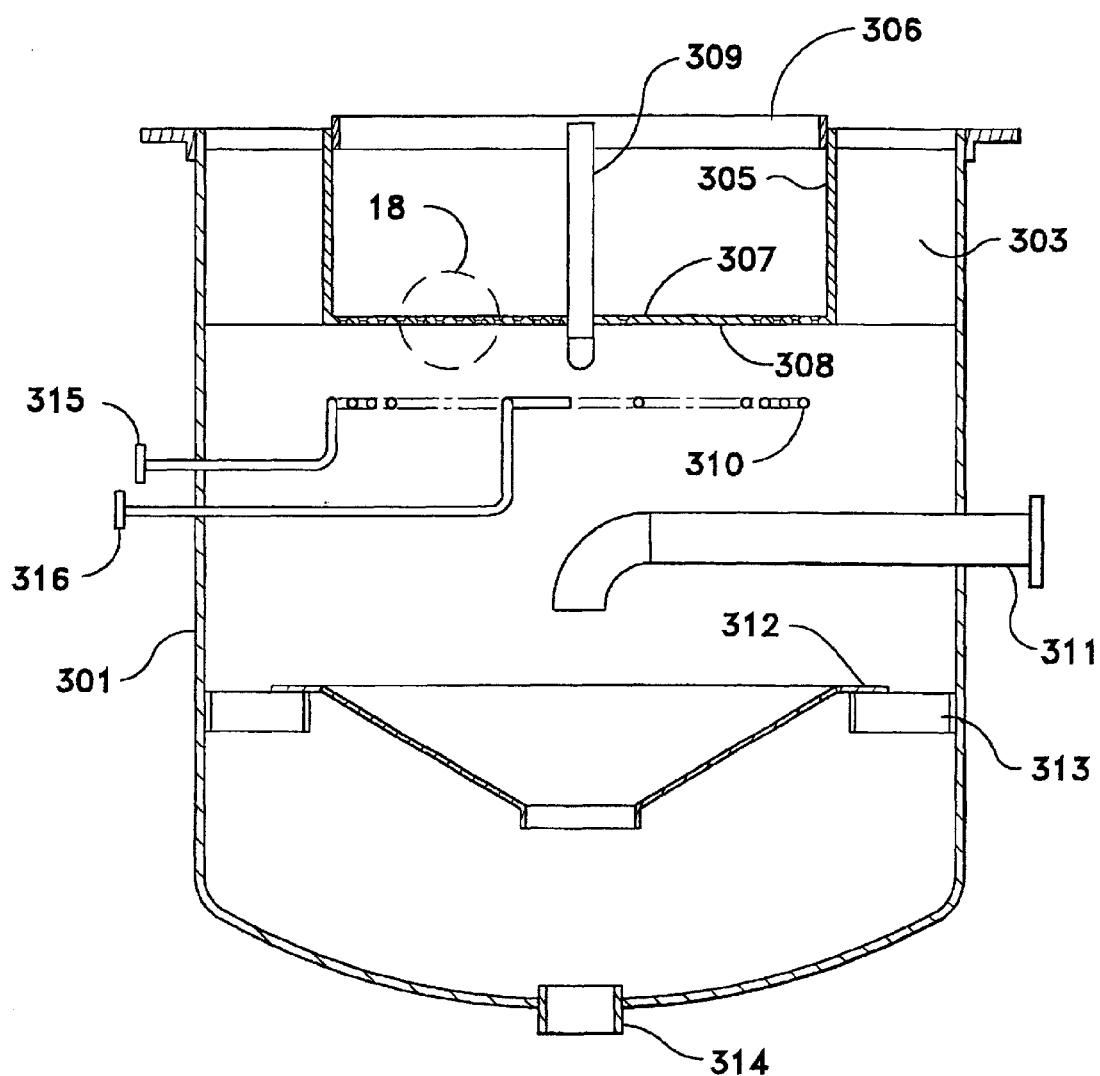
FIG. 4B is a section view along the lines 4B—4B of FIG. 4A.

Referring to FIGS. 1, 2A, 2B, 7, 8A, 8B, and 10–17, the separator section 100 has an outer, hollow, elongated, cylindrical shell 101 which is attached to the shell 401 of upper transition section 400 by bolting upper flange 102 to flange 402, and to the shell 201 of lower transition section 200 by bolting lower flange 102 to flange 202. A center well column 112 is disposed in the axial center of the shell 101 and extends the entire height of the separator section 100. A first well extension 203 extends the well column 112 through the lower transition section 200, as seen in FIG. 3B, and a further well extension defined by flow control cone 204 and lower well ring 305 extends the well column 112 into the heavy crude and sludge containment section 300, as seen in FIG. 4B.

Figure 10:
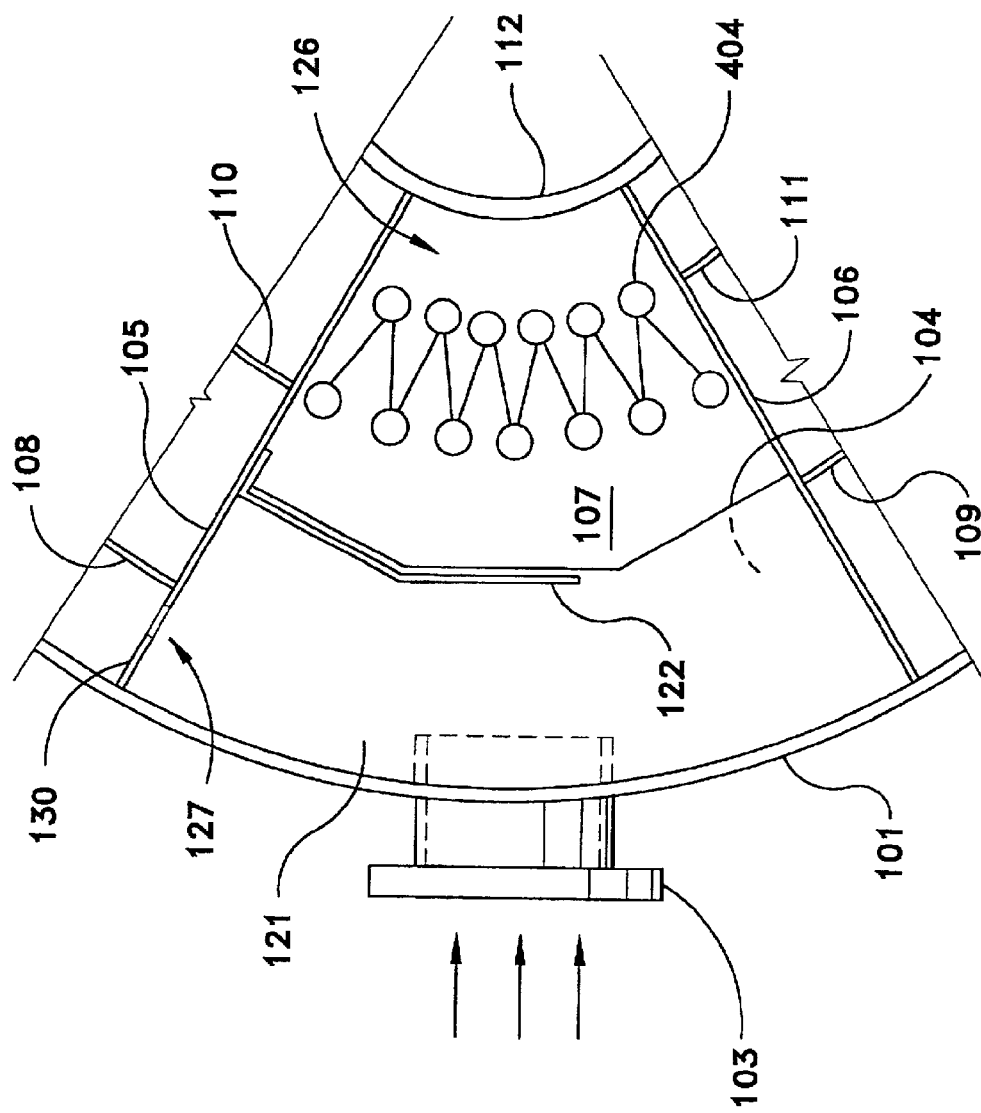
FIG. 10 is a top view showing the mixture inlet, vertical heating chamber, and entrance pathway into the curvilinear separator section of the apparatus according to the present invention.
Figure 12:
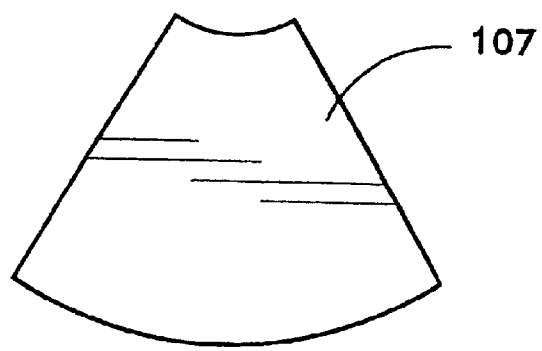
FIG. 12 is a top view of the lower inlet closure plate of the apparatus according to the present invention, the upper plate being identical.
Figures 13, 14:
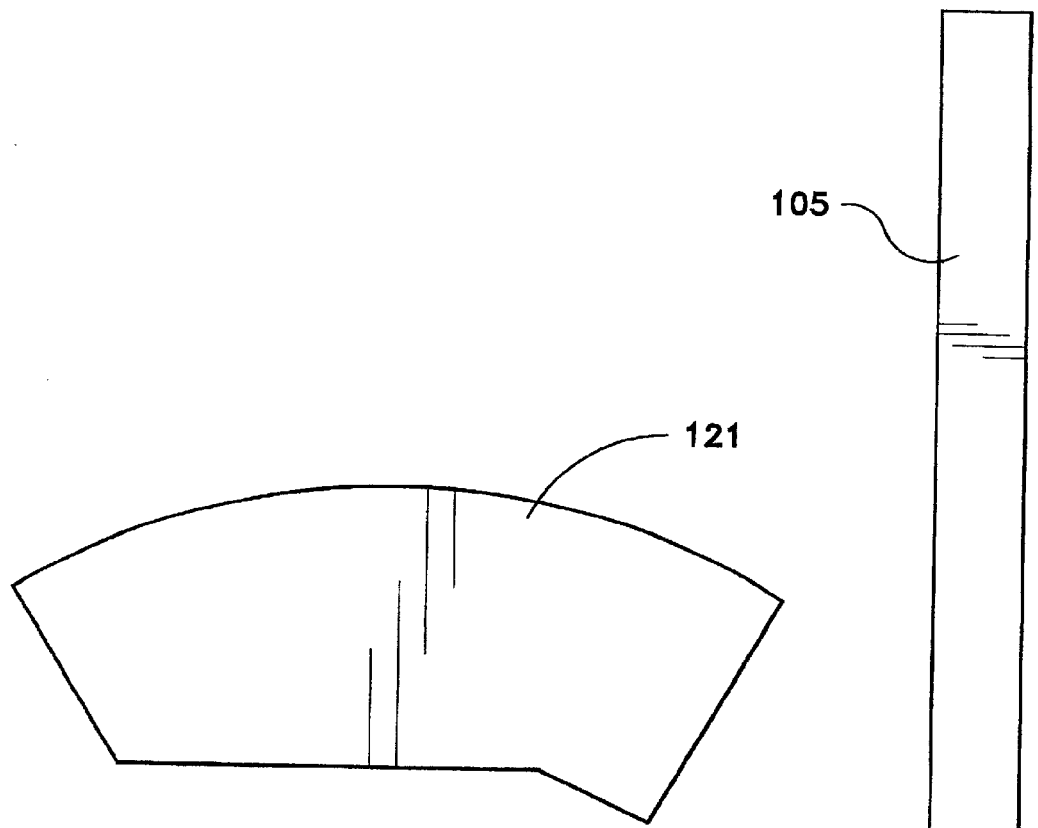
FIG. 13 is a top view of the inlet flow control plate of the apparatus according to the present invention.
FIG. 14 is a plan view of a pathway inlet panel of the apparatus according to the present invention.
Figure 15:
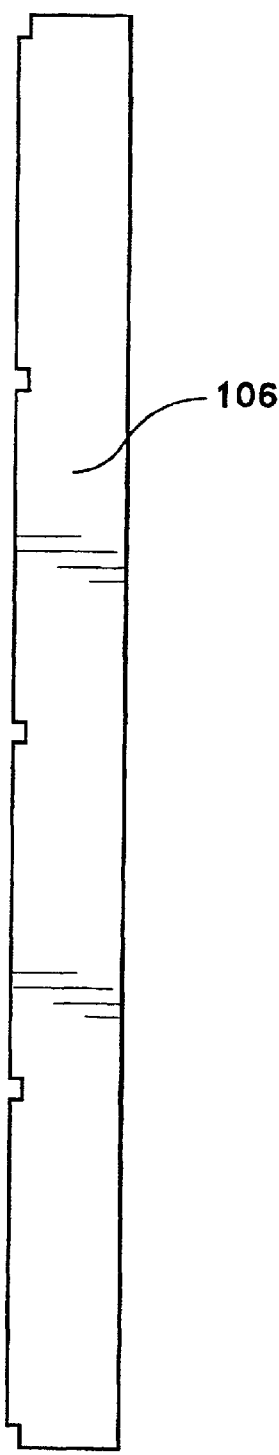
FIG. 15 is a plan view of a pathway closure plate of the apparatus according to the present invention.

Pathway closure panel 106, seen in FIG. 15, extends radially between center well column 112 and shell 101 for the full height of the separator section 100. Pathway inlet panel 105 also extends radially from center well column 112, but has a notch defined therein for at least part of its length so that it is spaced apart from shell 101 to define a Pathway entrance channel 127. The shell 101 may have a stationary vane 130 extending radially inward towards inlet panel 105 in order to adjust the width of entrance channel 127, as shown in FIG. 10. The acute dihedral angle subtended by closure panel 106 and inlet panel 105 and having its vertex in the axial center of well column 112 is preferably between about 30° and 60°. Upper closure plate 128 extends between shell 101 and well column 112, and between closure panel 106 and inlet panel 105 to close the acute dihedral angle at the top of the separator section 100, while lower inlet closure plate 107 extends between the same components to close the acute dihedral angle at the bottom of the separator section 100. Lower inlet closure plate 107 is shown in FIG. 12, upper closure plate 128 being identical, except that plate 128 has a plurality of holes defined therein to accommodate heater coils 404. Thus shell 101, well column 112, closure panel 106, inlet panel 105, upper closure plate 128, and lower closure plate 107 define a generally pie-shaped closed compartment.

Figure 5A:
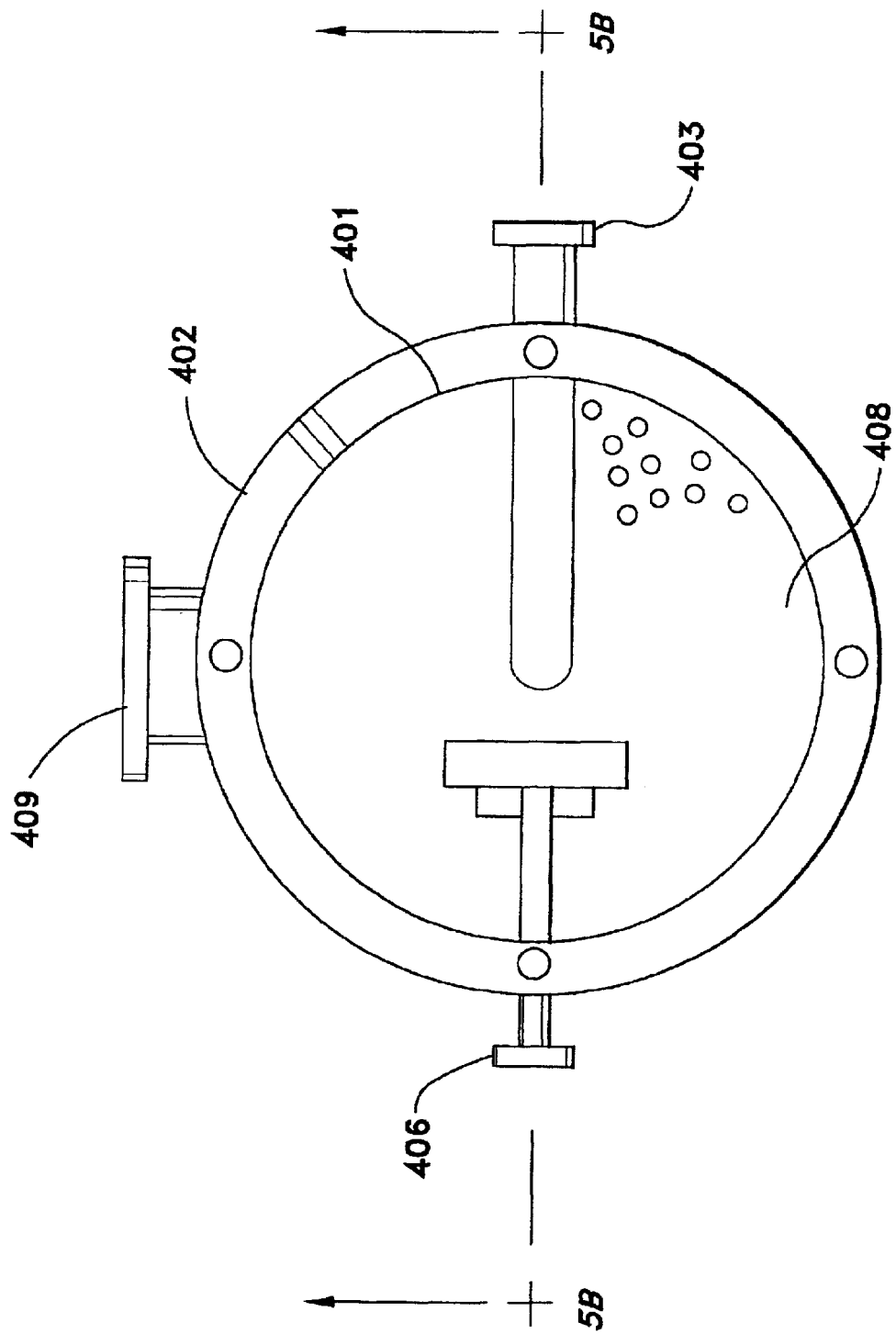
FIG. 5A is a top view of the upper transition section of the apparatus according to the present invention as viewed from lines 5A—5A of FIG. 1.
Figure 5B:
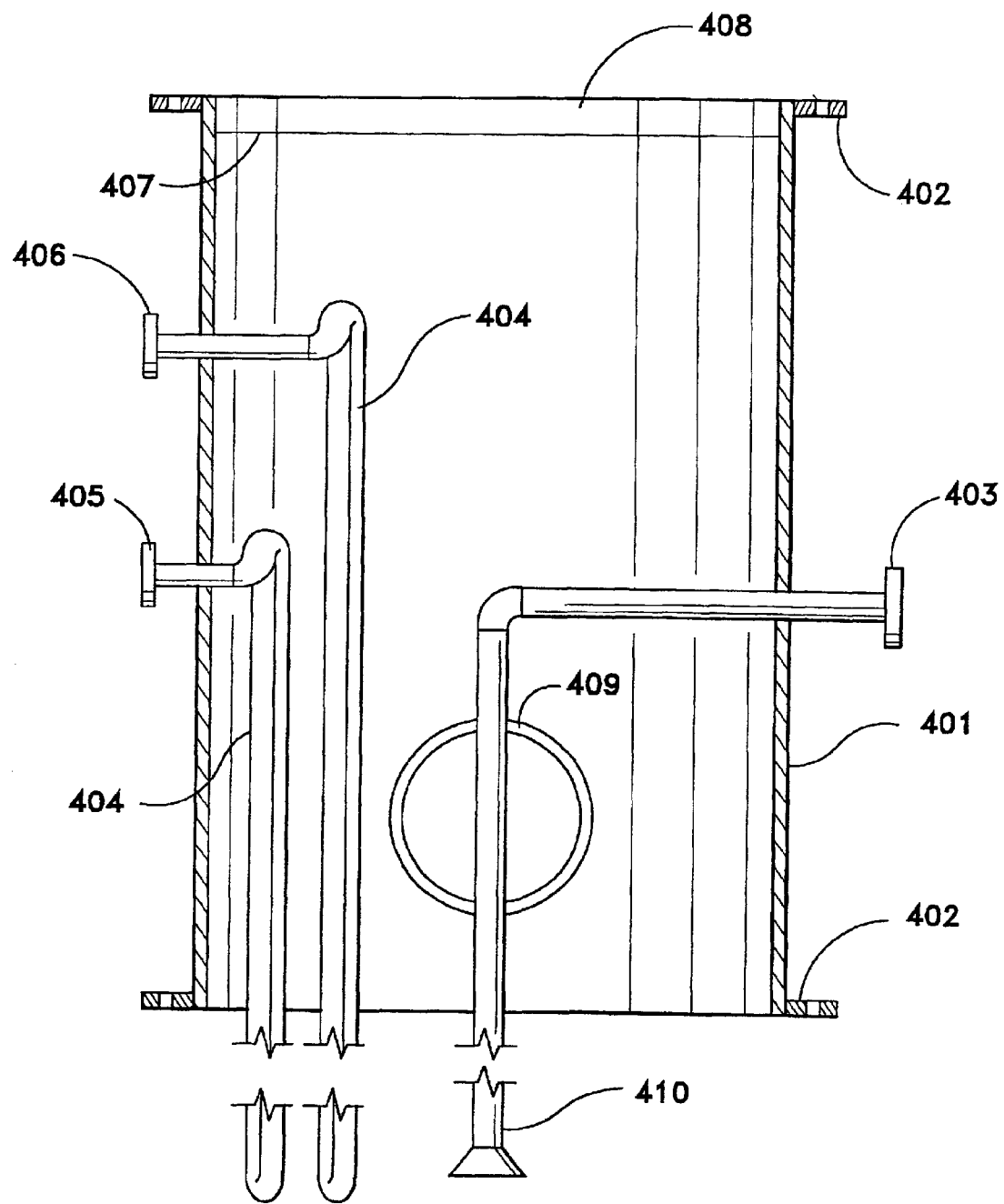
FIG. 5B is a section view along the lines 5B—5B of FIG. 5A.

Upper inlet flow control plate 121 extends inward from shell 101 towards well column 112 between upper closure plate 128 and lower closure plate 107, dividing the pie-shaped closed compartment into a lower inlet chamber 104 and an upper heating chamber 126. An oil-water-gas mixture is introduced into inlet chamber 104 through inlet pipe 103. Upper flow control plate 121 does not extend all the way to well column 112, being spaced apart from well column 112 to leave a passage for incoming fluid to pass from inlet chamber 104 to heating chamber 126. Steam is introduced through steam inlet 405 in upper transition section 400, and is distributed through a manifold to a plurality of heating coil tubes 404 which pass through upper closure plate 128 into heating chamber 126, and returns in tubes 404 through closure plate 128 to a second manifold in upper transition section 400, exiting through steam outlet 406, as shown in FIGS. 5A and 5B.

Separator section 100 includes a plurality of curved walls 108, 109, 110, and 111 of progressively smaller diameter which extend from top to bottom of the separator section 100 and generally subtend the obtuse dihedral angle defined by closure panel 106 and inlet panel 105, defining Pathways I, II, III, IV, and V. Entrance channel 127 debauches into Pathway I, and curved walls 108, 109, 110 and 111 are alternately spaced apart from either closure panel 106 or inlet panel 105 so that Pathways I–V are sequentially connected, defining a curvilinear flow path with multiple reverse flow paths. Curved walls 108–111 are supported by support rings 113, 114, 115, 116 and 117, and maintained in spaced apart relation by spacers bars 118, 119 and 120 attached between adjacent support rings in the manner shown in FIGS. 7, 8A and 8B. Vertical flow control pane 122 is mounted on top of upper inlet flow control plate 121 and extends upward to the top of separator section 100 for a purpose described below. Other structural features of the separator section 100 are described below.

In the following discussion, there will be certain physical and hydraulic relationships that will be maintained for the device and processes therein. For the purpose of this discussion, the liquid mixture will be incompressible, and the percentage of the mass of vapor contained in the liquid vs. the mass of liquid shall be in the order of 0.5% to 1.5%. The hydraulic relationship that defines the constant flow device is the continuity equation, viz.:

$$Q = V_1 A_1 = V_2 A_2 = V_3 A_3 = \ldots = V_n A_n = \text{Constant (ft}^3\text{/s)}$$

where Q is the volumetric flow rate, V is the velocity, and A is the cross-sectional area of the conduit. The only exception from the above will be the relationship of the vapor that is being removed from the vessel within vapor dome 500 in FIG. 1.

The fundamental principal that applies to a particle immersed in a fluid is known as Archimedes' principle. Simply stated, a body immersed in a static fluid experiences a buoyant or lift force equal to the weight of displaced fluid. If the body either rises or falls within the fluid the condition is described as unstable equilibrium and a dynamic force resisting the motion of the body is called drag. The equations expressing these are as follows.

Whenever relative motion exists between a particle and a surrounding fluid, the fluid will exert a drag upon the particle. In steady flow, the drag force on the particle is:

$$F_D = \frac{C_D A_p \rho u^2}{2}$$

where $F_D$=drag force $C_D$=drag coefficient $A_p$=projected particle area in direction of motion $\rho$=density of surrounding fluid u=relative velocity between particle and fluid.

The drag force is exerted in a direction parallel to the fluid velocity. The above equation defines the drag coefficient. For a solid particle falling:

$$\left(\frac{1}{6}\pi D^3 \frac{\rho_p}{G}\right) \geq \left(\frac{1}{6}\pi D^3 \frac{\rho}{G}\right) + F_D$$

For a solid particle rising:

$$\left(\frac{1}{6}\pi D^3 \frac{\rho}{G}\right) \geq \left(\frac{1}{6}\pi D^3 \frac{\rho_p}{G}\right) + F_D$$

Laminar flow occurs when the forced movement of a liquid through a conduit can be described as a telescopic sliding of adjacent concentric layers of liquid without transverse mixing. Each layer tends to maintain its own identity. The equation for Reynolds number is:

$Re = \rho VD/\mu$ where D=hydraulic diameter expressed in feet.

The resistance to motion within a channel is mainly due to molecular interactions within the liquid. In a given channel that has relationships that have Reynolds' Number 2,000 or less, the liquid velocity is zero near the wall and gradually progresses, in a parabolic profile, to its maximum velocity at the center of the fluid stream, as shown by the curves 902 and 904 in FIG. 9. Transitional flow occurs when the flow begins to lose its laminar characteristics to become turbulent due to an increase in velocity, and the velocity profile will become a modified parabola flattened at its center.

The present invention has internal means of controlling the hydrostatic liquid levels within the system, and the flow of fluids of different densities through the separator is controlled by outside regulating stations that include throttling, valves, flow meters, pressure regulators, etc. The flow through the separator section 100 is controlled in such a manner that the fluid stream remains laminar throughout the process, and the principles of particle dynamics can be employed. The time-dependent motion of particles is computed by application of Newton's second law, equating the rate of change of particle motion to the net force acting on the particle. The net torque induced causing the rotation of a particle can be determined from the product of the diameter of the particle and the delta force caused by the velocity differential. For large particles moving through low-density gases, it is usually sufficient to compute the force due to fluid drag from the relative velocity and the drag coefficient computed for steady flow conditions. For two- and three-dimensional problems, the velocity appearing in the particle Reynolds number and the drag coefficient is the amplitude of the relative velocity. The drag force, not the relative velocity, is to be resolved into vector components to compute the particle acceleration components. Clift, Grace, and Weber (*Bubbles, Drops and Particles*, Academic, London, 1978) discuss the complexities that arise in the computation of transient drag forces on particles when the transient nature of the flow is important. Analytical solutions for the case of a single particle in creeping flow ($Re_p=0$) are available. For example, the creeping motion of spherical particle released from rest in a stagnant fluid is described by:

$$\rho_p V \frac{dU}{dt} =$$

$$g(\rho_p - \rho)V - 3\pi\mu d_p U - \frac{\rho}{2}V\frac{dU}{dt} - \left(\frac{3}{2}\right)d_p^2\sqrt{\pi\rho\mu}\int_0^t \frac{(dU/dt)_{t=s}ds}{\sqrt{t-s}}$$

Here, U=particle velocity, positive in the direction of gravity, and V=particle volume. The first term on the right hand side is the net gravitational force on the particle, accounting for buoyancy. The second is the steady-state Stokes drag. The third is the added mass or virtual mass term, which may be interpreted as the inertial effect of the fluid, which is accelerated along with the particle. The volume of the added mass of fluid is half the particle volume. The last term, the Basset force, depends on the entire history of the transient motion, with past motions weighted inversely with the square root of elapsed time. Clift et al. proved the integrated solution.

It can be readily seen that as the density of a particle $\rho_p$ approaches the density of the carrying fluid $\rho$ in a dynamic fluid stream, the time required to cause particle separation increases. As may be recognized, the particle motion in a fluid stream is governed by physical properties and kinetic forces that are defined by the relationships of Reynolds' number (Re), drag force and relative densities. The relationship of time, distance and particle velocity can readily be seen in FIGS. 2A and 7, where liquid moves in a continuous path that is comprised of multiple circular, counter rotating paths (Pathways I through V). The fluid velocity within this pathway is constant; therefore, the time required for a particle to enter Pathway I and exit the Pathway V and enter into the center well column 112 will be equivalent to the sum of the mean lengths of Pathways I, II, III, IV and V, divided by the velocity of the liquid. This will be further discussed below.

In oil-water mixtures, oil is dispersed in the water and is carried by the water, in effect dragging oil droplets along the flow path. It is desirable that separation of the oil particles from the water occurs within a moving fluid stream. For this condition to exist, the fluid stream must be controlled so that fluid motion be laminar or transitional with the Reynolds' number (Re=$\rho$d v/$\mu$) having a range of 500 to 5,000. Newton's Law (expressed in the equation below) describes and applies to the particle dynamics of a fluid in motion as described above. Specifically, the terminal velocity $u_t$ of a particle within a dynamic fluid stream is expressed by the following equation where the relative velocity u between the particle and the fluid is proportional to the particle's size, shape, and density, defined as drag, a portion of which is surface tension $\sigma$, with a Re>0.10:

$$u_t = 1.73\sqrt{g \cdot D_p \frac{(\rho_l - \rho_p)}{\rho_l}}$$

where:

$\rho_l$ is the density of the liquid $\rho_p$ is the density of the particle d is the projected diameter of the particle g is the gravitational constant As can be seen from above, oil particles with very small diameters have a tendency to remain suspended and to be carried within the fluid stream. These particles, being very small, can be considered to be spherical in shape and can be treated as a rigid particle for this application. These particles are acted on by forces of motion, temperature, and buoyancy, which cause movements of these particles from a variance of energy levels, and as a result, the motion of the particles will cause random collisions with other like particles through mutual attraction. This condition is known as nucleation of particles of similar size and mass. Once these particles combine, they agglomerate into larger particles that move rapidly toward an energy level that relates to its relative density. This process that occurs within a mixture of immiscible liquids in motion will cause the accelerated agglomeration and migration of separated immiscible liquids of varying densities within the liquid stream.

The above principles of particle dynamics and nucleation are implemented in the embodiments of the separator apparatus 50, and more particularly in the arrangement of the separator section 100. The separator section 100 has a defined continuous curvilinear channel formed by shell 101, vertical plates 108, 109, 110, and 111, and center well column 112 which are all coaxial and arranged in a manner such that a singular continuous counter flow pathway is formed and defined as the primary fluid circuit. The fluid flow pathway through the separator section 100 in FIG. 2A is shown enlarged as Pathways I, II, III, IV & V in FIG. 7, providing a channel with a total length to allow particle movement to agglomerate and to rise to a level sufficient for the agglomerated particles to be discharged into the center well column 112 through ports 125. The effective channel length is a function of the channel geometry, hydraulic entrance and exit losses, and fluid directional changes (180° turns) within the flow pathways, and is defined by the following relationship:

Channel Length $L_c = K_{eff}(R_1 + R_2 + R_3 + R_4 + R_5)$

Where:

$R_1$ through $R_5$ equals the mean effective channel radius for pathways I through V respectively (refer to FIG. 9 for mean channel radius R, showing that the mean radius is measured to the center line of the Pathway); and $K_{eff}$ equals to a value of 5.15 to 5.6, as defined by the fluids characteristic, pathway geometry, and radius turns between Pathways I through V.

The fluid flow into the center well 112 is such that it can be considered non-turbulent and the separated liquids will remain stratified as in relationship to their densities.

In addition to the particle movement through particle dynamics as described above, a condition will exist where a convection current will occur due to temperature gradients existing between separator section 100, lower transition section 200, and containment section 300, shown in FIG. 1. This is accomplished by allowing the heavy liquids and brine to be discharged directly from the bottom of separator section 100 into the lower transition section 200 and finally, into containment section 300, where the liquid temperatures in the section 300 are maintained from 100° F. to 110° F., as compared to a liquid temperature of 160° F. to 180° F. in the separator section 100. The liquid densities in the lower transition section 200, because of the cooler temperatures, are increased by a factor of 1.5–3%. This causes the denser liquid to move downward from the bottom of the separator section 100, along the pathway formed by the shell 101 and the cone section 204 within the transition zone 200, and thence into the lower containment section 300.

Brine water will be allowed to move upward through a perforated plate (sieve plate) 308 (supported by plate receiver 307), because brine is less dense than the heavy crude, in order to enter the center tube column 112 through the lower extension 203. In addition to the liquids that were not released, the gas bubbles generated within section 300 will travel upward through lower well ring 305 and cone section 204 and discharge directly into center well column 112 via well extension 203. Oil particles will attached themselves to these gas bubbles and rapidly move towards the surface of the liquids within the center tube column 112. During this movement, it will pass through the emulsified liquid zone, which will cause an accelerated agglomeration of free oil particles and further accelerate the separation process.

The above description defines the operation for the constant flow, compound, liquid/liquid/vapor separator device 50, process and method for removing and separating particles of a first liquid from a second liquid using the laws of particle dynamics, agglomeration kinetics, particle translation and fluid motion due to conduction within a continuous contact, hydrostatically balanced, vertical tower. As stated earlier, the first liquid shall be defined as the carrying fluid or the continuous phase liquid such as water, and the second liquid defined as the carried fluid containing immiscible with specific difference physical properties, such as oil, with both liquids being combined into a flowing fluid mixture.

The apparatus 50 incorporates the following elements and/or sections that are formed by using flow channels, standpipes, perforated plates, temperature control elements, internal float valve regulator, and/or partitions within the vessel or tank. The apparatus 50 has a mixture inlet 103 that discharges directly into an enlarged inlet chamber 104, the mixture then being directed vertically through an opening formed by plates 121, 106, 105, and the center tube column 112. This opening is sized to allow a slight increase in velocity to cause the liquid to move vertically along the axis of the separator 50 into a heating chamber 126 that has within the section a counter flow heat exchanging unit formed by vertical tubes 404 that will contain 125 psig steam. The number of tubes required for the heating chamber is determined by the entering fluid temperature, type of mixture (i.e. paraffin-contained crude), heat exchange material (i.e. stainless steel, copper), and the desired flow rate, which determines the efficiency of heat transfer. The fluid then passes from chamber 126 through a passage way formed by vertical flow control vane 122 that has an opening cross-sectional area which is 110–125% larger than the cross-sectional area opening into the curvilinear pathway section. This passageway is formed by the upper closure plate 128, pathway inlet panel 105, pathway closure panel 106 and upper inlet flow control plate 121. The fluid is then directed into the curvilinear Pathways I, II, III, IV and V through pathway inlet panel 105 that has an opening of sufficient size to maintain an entrance velocity into the Pathways such that it is no greater than 110% of the velocity of fluid flow within Pathways I, II, III, IV and V. The separator 50 is further equipped with a crude extraction tube 403, a heavy crude section 300, a water removal standpipe 303, a lower transition section 200, an upper transition section 400 and a vapor dome 500 for vapor extraction.

The crude oil/brine mixture enters into the separator section 100 through the inlet 103 as shown in FIG. 10, and is horizontally discharged directly into a receiving chamber 104 formed by the lower inlet closure plate 107 and the upper inlet flow control plate 121. The velocity of the entering liquid should be 4 to 5 ft/s within the inlet pipe 103. As this liquid enters into the receiving chamber 104, the velocity is suddenly reduced due to the change of ratio of the cross sectional areas. The ratio of cross sectional area of inlet pipe 103 to the area of a perpendicular plane formed within chamber 104 by the upper inlet flow control plate 121, lower inlet closure plate 107 and sides formed by closure plate panel 106 and inlet panel 105, should be between 1:30 to 1:40. The above-described sudden change in the fluid stream cross sectional areas will cause a rapid decrease in velocity proportional to the ratios described above and will be the magnitude of:

$$V_2 = \frac{V_1 A_1}{A_2}$$

Figure 7:
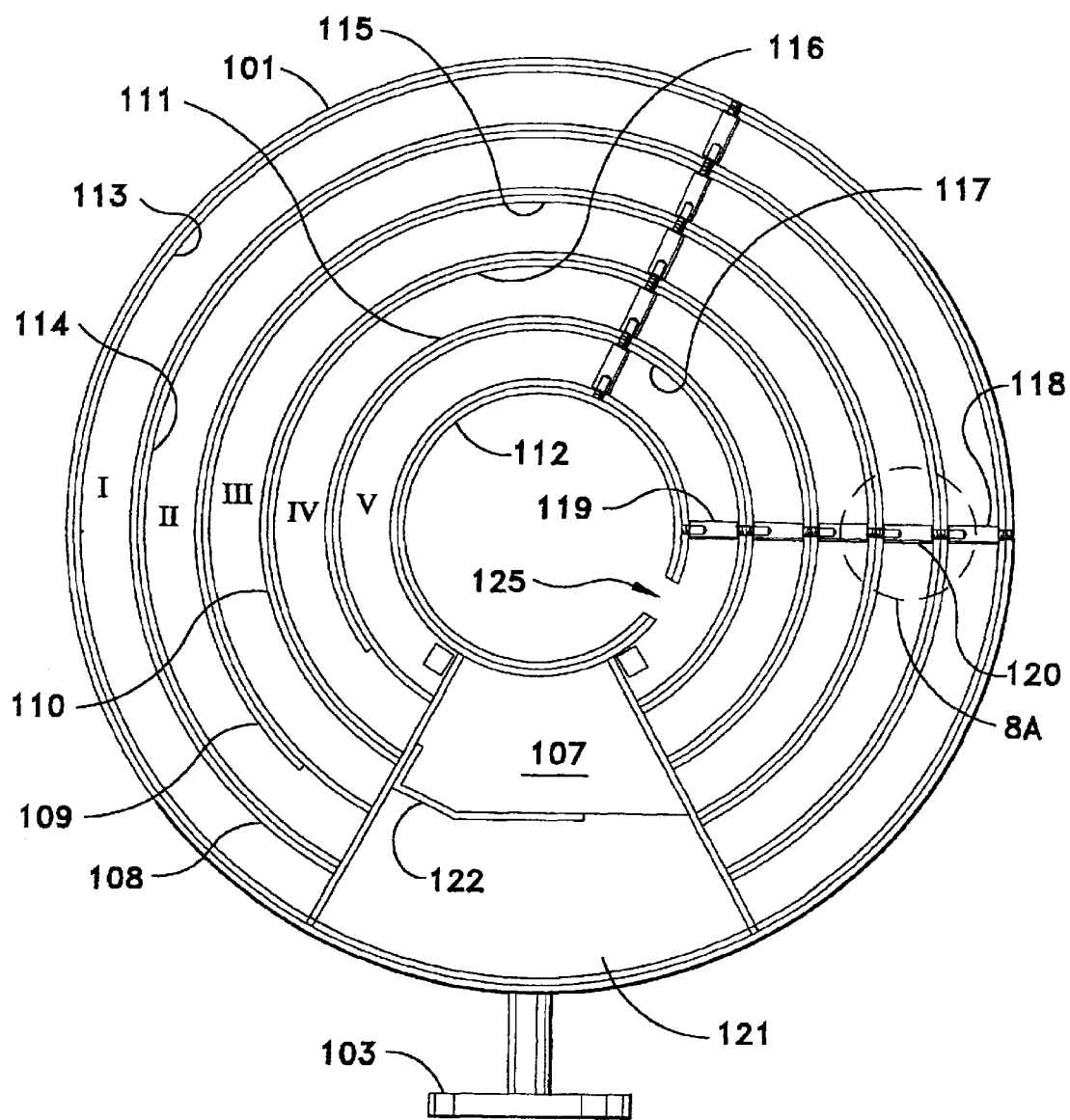
FIG. 7 is a section view taken along the lines 7—7 of FIG. 1.
Figure 8:
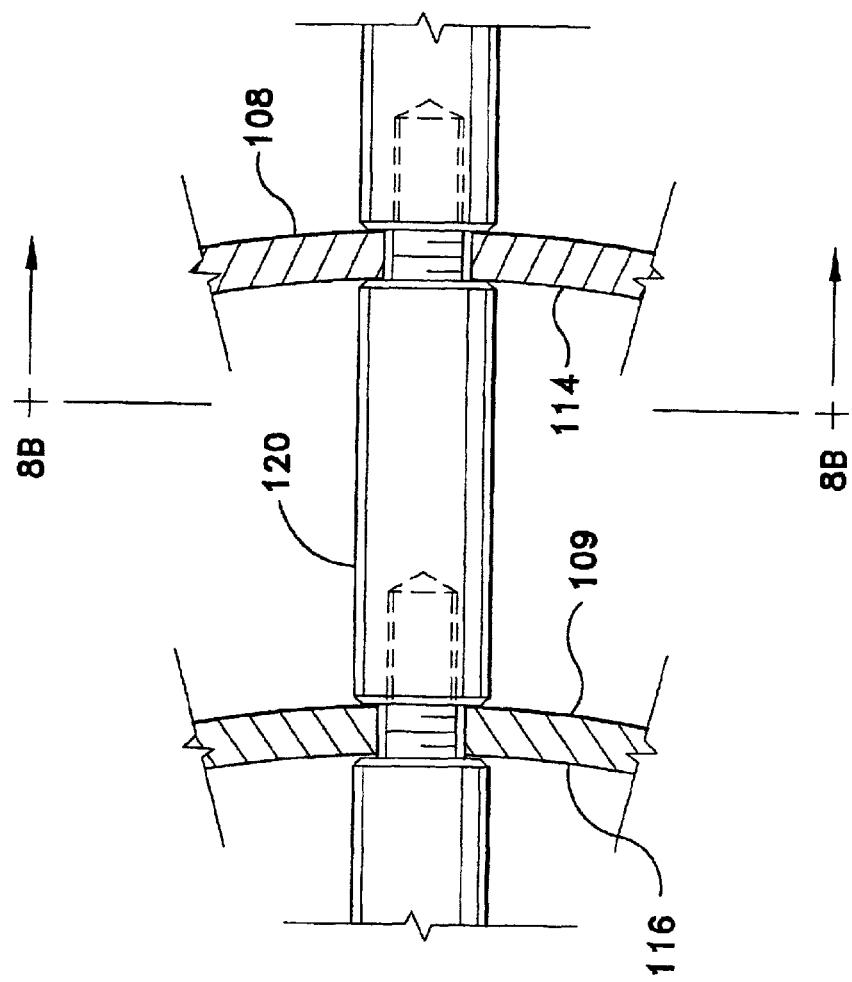
FIG. 8A is an enlarged detail view of area 8A in FIG. 7.
FIG. 8B is a section view along the lines 8B—8B of FIG. 8A.

The crude oil and brine mixture exits chamber 104 and is then directed upwards and along the vertical axis through the opening between the upper plate 121 and center tube column 112. The cross sectional area of this opening is sized so the velocity entering into the heating chamber 126 is not greater than 125% of the velocities within the Pathways. The heating chamber 126 formed by vane plate 122, center column 112 and pathway inlet panel 105 and pathway closure plate 106 as described previously has a volume such that the liquid will remain in contact with the heating coils 404 for a time period of ten to fifteen minutes. This will allow the liquid to reach the preferred operating temperatures from 160° F. to 180° F. Within the heating chamber 126, the fluid moves vertically and passes the heating coils 404 prior to exiting the chamber through the pathway formed by vane 122, upper flow control plate 121, upper closure plate 128 and inlet panel 105 into the separator entrance channel 127. The vertical fluid motion that occurred within the chamber 126 is converted to a horizontal flow within the entrance channel 127 prior to entering Pathway I. The flow within entrance channel 127 is tangent to and perpendicular to the axis of rotation of the fluid within the separator section 100 as shown in FIG. 7. The vertical Pathway I is formed by the outer shell 101 and the curved plate 108. The fluid moves from Pathway I to Pathway II, thence from II to III, thence from III to IV, thence from IV to V, forming a continuous channel with fluid elements within the channel subjected to alternating forces which result from the counter-flow fluid movements. The Pathways herein described are narrow tall channels, which are formed by curved plates 108, 109, 110, 111 and center tube column 112. It is preferred that the ratio of channel width to column height be between 1:60 to 1:240. The aforementioned ratios are an essential requirement of this device, in particular, with the relationship of the hydraulic diameter in defining the value of Reynolds number of a fluid flow through an open channel. The equation for Reynolds number is:

$$Re = \rho V D / \mu,$$

where D=hydraulic diameter expressed in feet.

The hydraulic diameter for open channel flow is found by the equation:

$$D = 4hw/(2h+2w)$$

where h is the Pathway height and w is the Pathway width.

Substituting in the equation above, hydraulic diameters for the channels will range from $4(60w^2)/122w$ to $4(240w^2)/484w$, or 1.967w to 1.992w, respectively. As can be seen above, these width-to-height ratios will create channels such that when w ranges from 0.2 to 0.5 ft, hydraulic diameters will be less than 1.0 ft. This means that fluid flows can be maintained as laminar flows within the Pathways when the mean velocity of the fluid is 1 ft/s or less.

Figure 9:
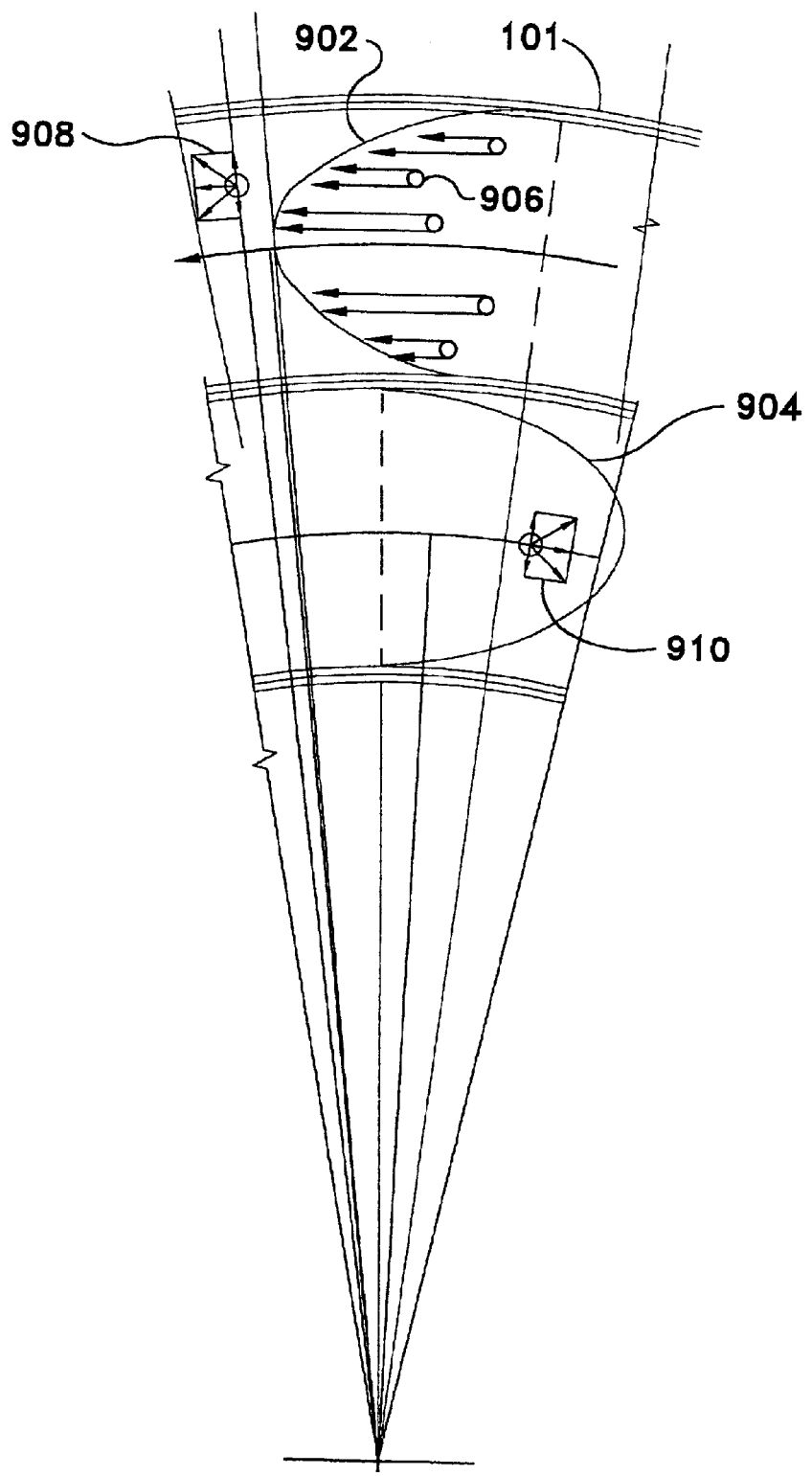
FIG. 9 is a force diagram of particles flowing within the curvilinear channels shown in FIG. 7.
Figure 11:
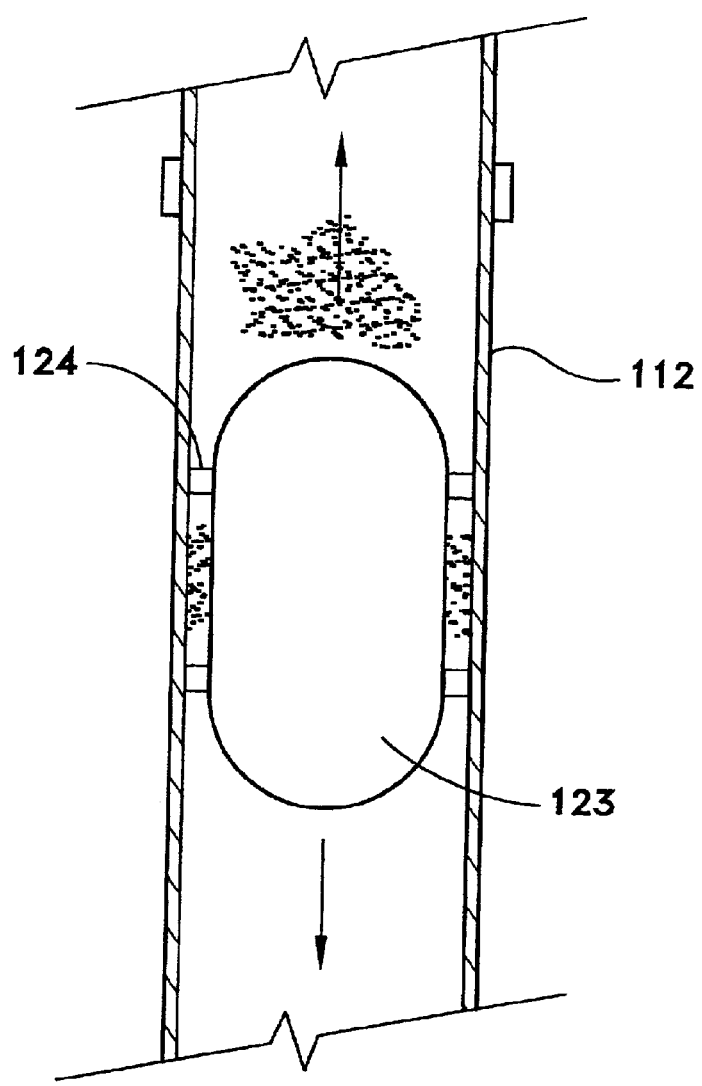
FIG. 11 is a vertical section view of the float and flow regulator within the center well column of the apparatus according to the present invention.
Figure 16:
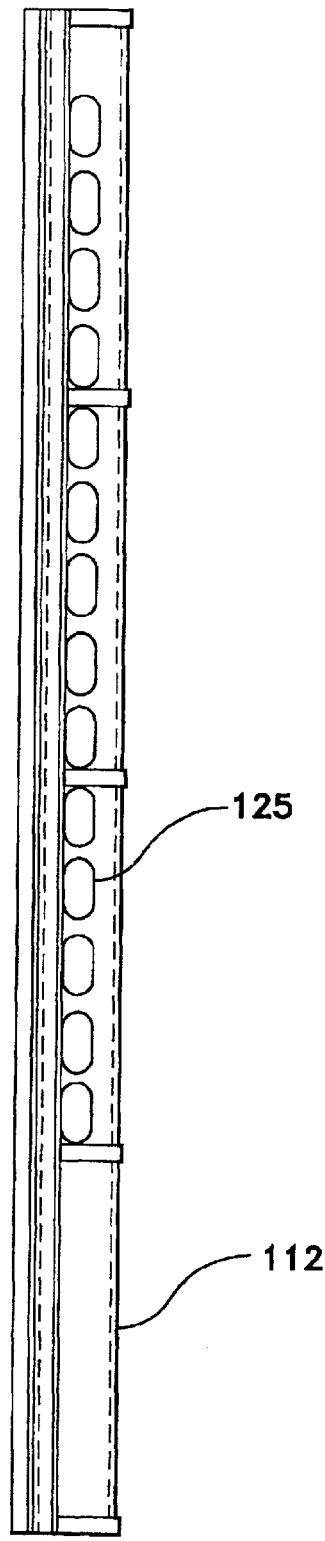
FIG. 16 is an elevation view of a center well column assembly of the apparatus according to the present invention.
Figure 17:
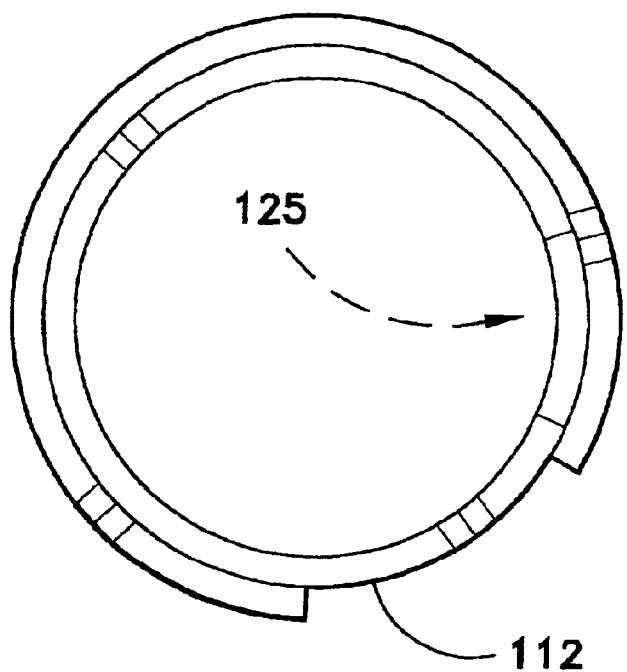
FIG. 17 is a top view of the center well column of the apparatus according to the present invention.
Figure 18:
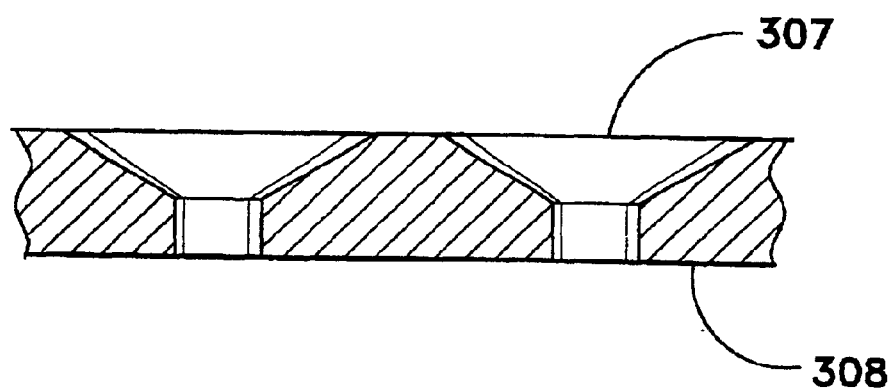
FIG. 18 is a detail view of the area 18 of FIG. 4B.

Referencing FIG. 9, the force diagram of particles 906 within a curvilinear chamber illustrates the action on a particle within the curvilinear chamber. A combination of angular momentum, changes in flow directions (counter flow) and transverse velocity gradient generated by the laminar flow imparts a force equivalent to the sum of the velocity and centrifugal forces; this resulting force shall alternate (as in counterclockwise force diagram 908 and clockwise force diagram 910) as it is dependent upon the direction of fluid flow. The force herein described causes the suspended particles to rotate and move within the defined curved path toward the lower potential energy regions, which in most instances shall be adjacent to channel walls where the relative velocity approaches zero. During the particle movement, a singular particle will randomly collide with other suspended particles of similar characteristics in the process known as nucleation and cause the growth and consolidation of particles (agglomeration). Additional interaction between the aforementioned gas particles and oil particles suspended within the flow stream shall further enhance particle movement and translation. The agglomerates of oil particles will quickly coalesce with other similar particles, thus causing the agglomerate to rise due to the differences in densities of the immiscible and carrying fluids. The length of this channel is the sum of the mean lengths of Pathways I, II, III, IV and V, and defines the residence time so that particles of different densities have sufficient time to rise or fall as required for separation. FIG. 1 shows that higher density particles (heavy) are discharged directly from the bottom of separator section 100 into the transition section 200, and settle within the heavy sludge and oil containment section 300. The lighter crude and/or particles rise and continue to flow within the curvilinear pathways, and enter into the center well column 112 through ports 125, as shown in FIG. 16, where the fluid can be extracted without remixing. The center tube column 112 allows the fluids to be extracted, prevents uncontrolled interchange of water and other particulates that have been separated, and controls hydrostatic equilibrium within the system. Referring to FIG. 11, a float/flow regulator 123 is shown within center tube column 112 that is allowed to move vertically within the center tube column 112. The float 123 has a specific gravity equal to that of water, so that it remains within the transitional zone 200 where the densities of the liquids are less than or equal to that of brine water. FIG. 11 shows that the float 123 has an outside diameter less than the interior diameter of the center tube column 112, and is equipped with a synthetic hollow-tube bristle ring 124. This ring 124 maintains the location and alignment of the float 123 within the center of the tube column 112, as well as allowing gases and other lighter oil particles to pass around the periphery of the float 123. The gases are discharged into the gas dome 500, where the lighter oil particles are entrained in the liquid zone above. The lighter oil is collected through the well ports 125, located in the zone above the normal carrying fluid operating level. The separated oils that are collected within the center column 112 are removed through the oil extraction pipe 403.

The normal operation of the separator 50 provides for the stratification of liquids with different densities. The aforementioned float 123 further contains and limits the uncontrolled mixing of fluids within the center column 112. An additional function of the float 123 is to prevent the accidental discharge of oil into the brine extraction pipe 309, as well as to prevent brine water from being removed from the separator 50 through the oil extraction pipe 403. Referring to FIG. 1, the center well 112 extends from the top of the separator section 100 into the upper liquid zone of heavy crude and sludge containment section 300. The aforementioned float 123 is allowed to move within the center column 112 and has a limited travel distance. Referring to FIG. 3B, lower seat ring 207 defines the lower limit where the float can 123 travel as described above. Referring to FIG. 5B, the upper limit is set by the extraction tube 403. The extraction tube 403 is equipped with a concentric bell 410 that is equipped with a float seat to prevent the accidental discharge of brine into the oil extraction tube 403, and into the recovered oil storage facility.

In the prior discussion, the pathways are described as very narrow, tall channels with width to length ratios up to 1:240. The geometry of these narrow, tall pathways cause particle movements to accelerate by the capillary action of liquids of different physical characteristics, as well as the movement of gas or vapor particles that are released by the rise of liquid temperatures, which has a tendency to cause volatile gases to be released from the liquid. This action of gas bubbles moving within the liquids will cause a "chimney" effect (FIG. 19) within pathways, wherein fluids move rapidly towards hydrostatic equilibrium, and further accelerate the movement and coalescence of the agglomerated particles as described above. At the beginning of the process, gas bubbles formed in the lower portion of the separator section 100 can be considered small, spherical particles. According to the perfect gas law, the internal energy within a gas bubble is:

$$u=f(T)$$

For this application, the temperature within the separator section 100 remains constant. Therefore, using the Ideal gas Law $$PV=nMRT$$

Applying this to the internal energy of the bubbles, which is equivalent to the function nMRT, the internal energy of the bubbles remains constant moving through the pathways. Or, $$P_1V_1=P_2V_2=\text{Constant}$$

Figure 19:
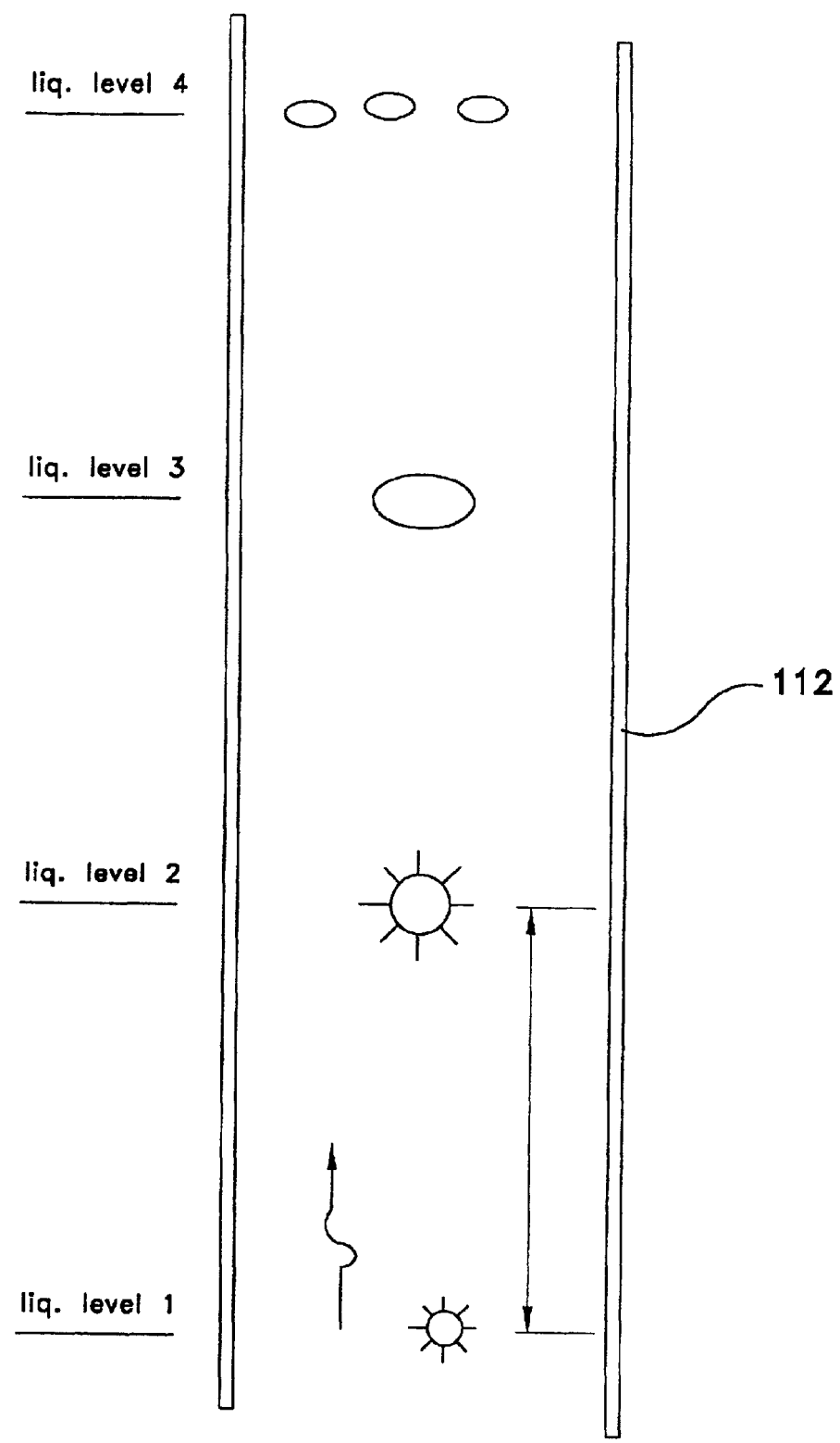
FIG. 19 is a schematic drawing showing gas particle vertical movement within a pathway of the apparatus according to the present invention.

As shown in FIG. 19, the pressure within the bubble will be equal to the sum of the hydrostatic pressures of the surrounding liquids. The liquid pressure equals to the height of the liquid multiplied by its density/weight. As can be seen in FIG. 19, as the bubbles rise from the bottom to the surface, the gas bubble will increase in size, due to the reduction of the hydrostatic pressure from the surrounding liquids. The bubble will rotate while rising; the rotation is a function of internal energy as well as the relative vertical velocity within the liquid. The bubble remains spherical in shape until the surface area of the sphere exceeds the value of the surface tension of the liquid, at which time the bubble will be an elliptical disc in shape, and the volume within the bubble will increase. As the gas bubble continues to rise, and the hydrostatic pressure continuous to be is reduced, the internal pressure exceeds the sum of the hydrostatic pressure and surface tension; hence, the bubble will subdivide or fragment into smaller components and continue to rise. During this movement from the bottom to the top, the bubble will accelerate and collide with oil particles, and in the nucleation process described previously further enhance the separating process.

The heavier particles and liquids that are discharged directly from the separating section 100 flow into the lower transition section 200, and thence into the heavy crude and sludge containment section 300. The flow pathway for the heavy oils, liquefied solids and brine is formed by the flow control cone 204, which is supported by non-rotating vane and cone support assembly 205. When liquids with different densities and viscosities are allowed to flow over an inclined plane, they tend to separate themselves relative to their kinetic viscosities, with the more viscose liquid adhering to the surface, and the less viscose liquid moving outward and passing over the more viscose liquid. This flow control cone 204 allows the more viscose liquid in the mixture to flow along the outer shell 201 to agglomerate and move at a rate that is dictated by its absolute viscosity. The less viscose liquid will move at a higher rate along the pathway formed between the shell 201 and the cone 204.

The downward flow path of the mixture discharged from the separating section 100 above is isolated from the clean water within the center well column 112 by the flow control cone 204 and a lower well ring 305. Also, a temperature gradient is formed by the differences between the temperature $T_1$ within the separator section 100 above and $T_2$ within the sludge containment section 300, which is housed within containment section shell 301, the sludge containment section 300 being connected to lower transition section 200 by bolting together lower flange 206 and flange 302. The heavy oil, liquefied solids, and water mixture's downward flow will be proportional to the changes in the liquid densities with respect to temperature, which is commonly referred to as liquid convection circulation. The pathway of the flow control cone 204 is extended into the lower portion of the sludge containment section 300 by a lower well ring 305 via interlocking ring 306 which attaches to a cylindrical skirt depending from control cone 204 to allow the fluid to move freely into this section 300. Horizontal rotation that may occur during the flow of the liquid over the cone 204 is stabilized by fixed stator ring 313 located within section 300. This passage is sized to allow the fluids to move very slowly and to minimize remixing of water and oils.

The heavy crude and sludge containment section 300 is sized to allow the liquids to reach a quiescent state, and has a liquid volume of approximately 80% of the liquid volume within the separating section 100. The temperature of the liquid ($T_2$) within the section is maintained with heating coil 310 at a temperature significantly lower than the operating temperature ($T_1$) of the separating section 100 above, but at a temperature so that the heavy oils will remain in a plastic/liquefied state. Steam is supplied to heating coil 310 through steam inlet port 315 and exits the coil 310 through steam outlet port 316. The density of the carrying fluid (brine), being less than that of the heavy oils, the brine will rise and pass through a perforated plate (sieve plate) 308 into the lower portion of the center column well section 112. The brine solution, because of the lower temperature, will be denser than the brine fluid within the separating section 100, in particular, the center column 112. The difference in the density of brine within the center column 112 and the brine in section 300 may be as much as 2%, and therefore, it is evident that a stable hydraulic equilibrium can be maintained between the brine within the center column 112 and the lower section 300. The heavy crude and liquefied solid can be removed from the containment section 300 through heavy crude extraction pipe 311. Water is removed/added from the standpipe through water outlet pipe 309. This pipe 309 is extended vertically into the flow control region as shown in FIG. 1 so that any addition or removal from the system will not cause turbulence and thus will prevent remixing of separated liquids.

The heavy sludge and solid particles are allowed to migrate along the plane formed by the internal hopper 312, and discharge into the lower portion of section 300. The sludge is removed through the draw off port 314. The support stator ring 313 prevents the liquids from rotating and remixing the sludge with the heavy crude during draw off operations.

Figure 6A:
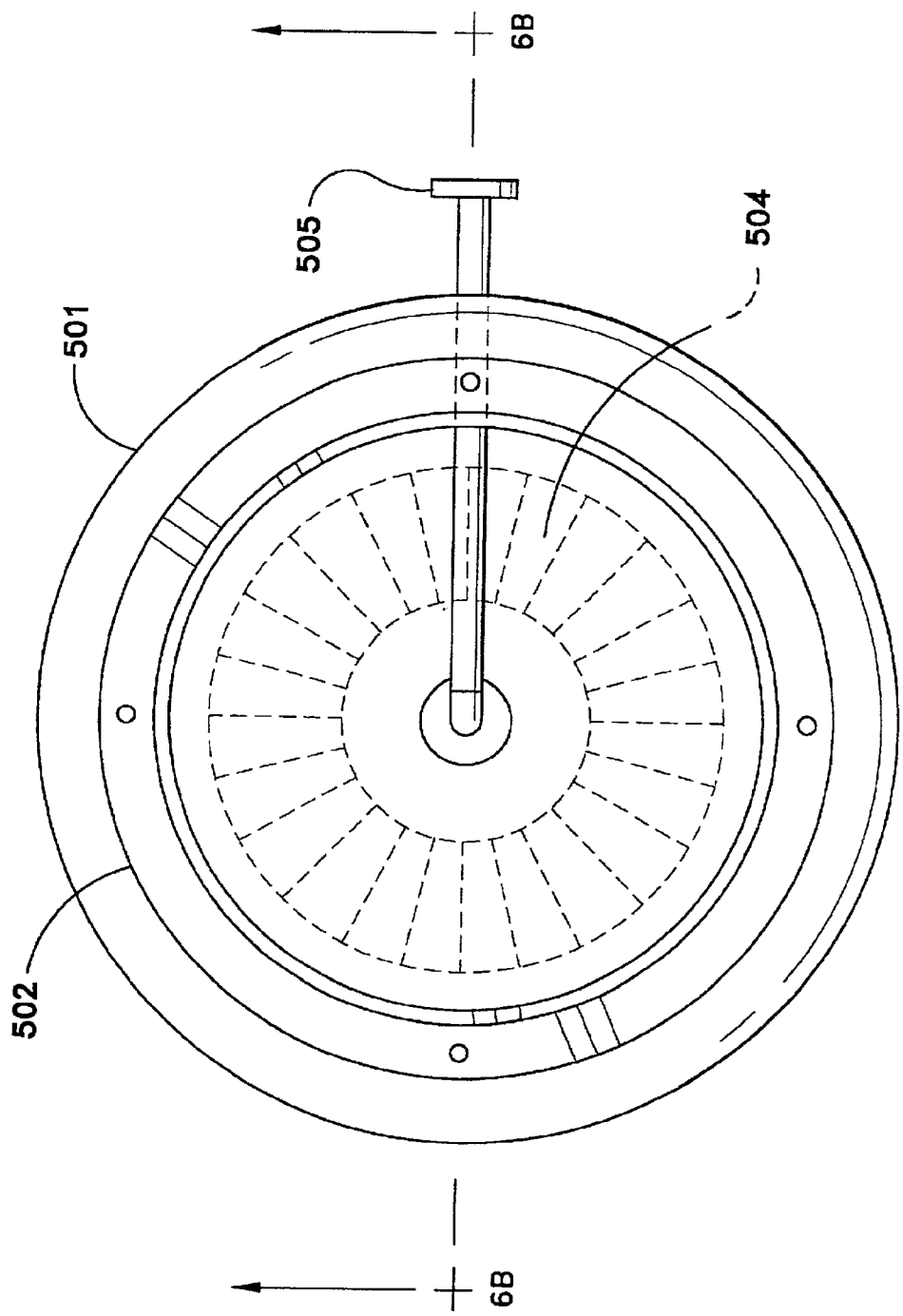
FIG. 6A is a bottom view of the vapor dome of the apparatus according to the present invention as viewed from lines 6A—6A of FIG. 1.
Figure 6B:
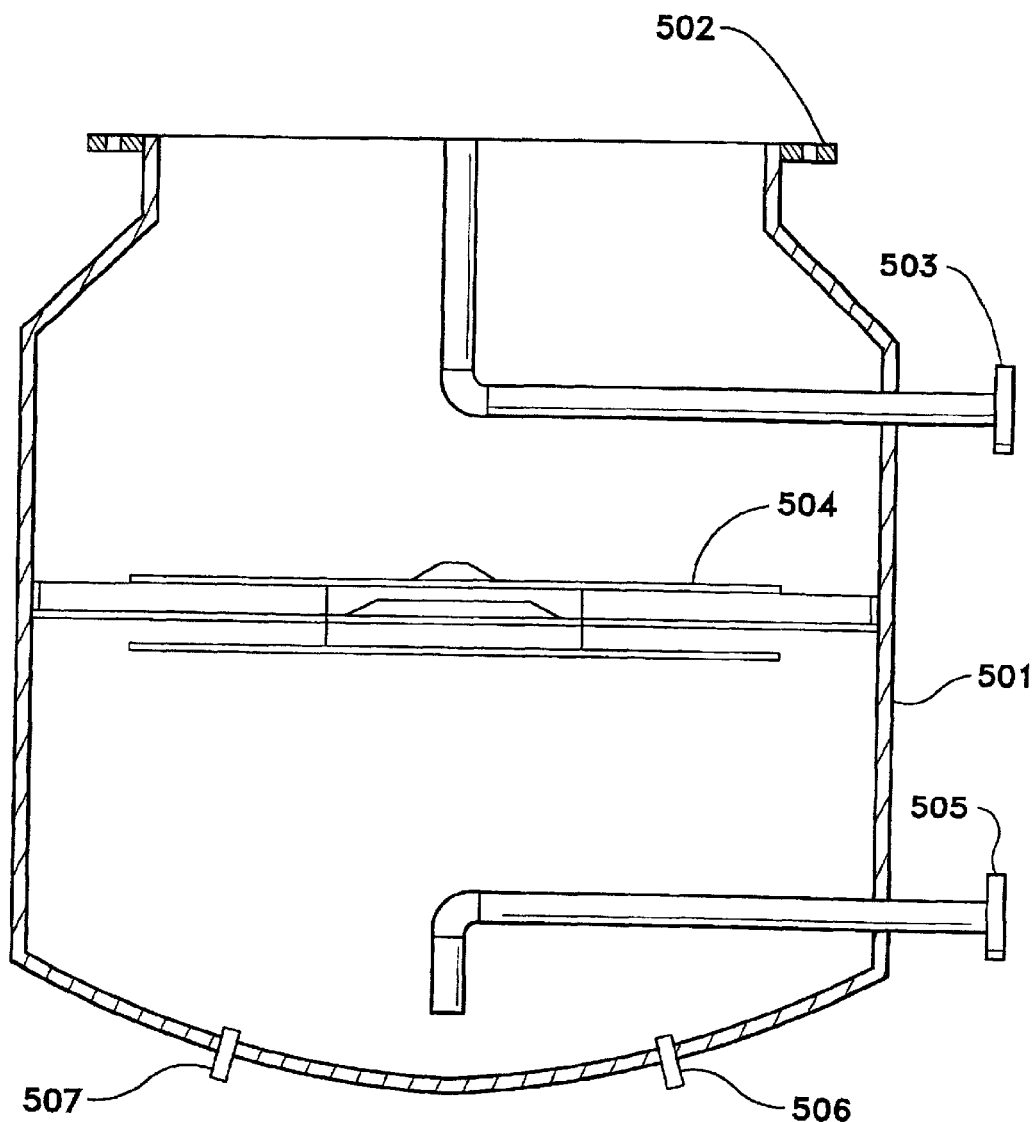
FIG. 6B is a section view along the lines 6B—6B of FIG. 6.

Vapors resulting from the heating of the heavy crude and oils in section 300 will be allowed to pass through the aforementioned perforated plate 308 into the center well column 112 by entering the center well column extension 203 through the ports within this extension. The gas particles travel through center well column and are directed and discharged into the gas/vapor dome 500 after entering the upper transition section 400 and passing through perforated plate 408, mounted on perforated plate support ring 407, located within section 400. The gas bubbles emitted from this process will pass through the brine, emulsified liquids and oil within the center column 112. During this process, oil particles not separated and suspended within the carrying fluid attach themselves to these gas bubbles and move into the upper zone of the separated oil, where they are released at the liquid/gas interface. The gas passes through the perforated plate 408 located in the upper transition section 400 and enters into the vapor dome 500. Temperature, flow rate, and other parameters in upper transition section 400 may be monitored through instrumentation port 409, shown in FIGS. 5A and 5B. As shown in FIGS. 1, 6A and 6B, vapor dome 500 is housed in shell 501 and is connected to upper transition section 400 by bolting together flanges 502 and 402. A counter rotating vane section 504 in vapor dome 500 causes remaining liquids in the gas to separate and fall back into the liquid section. Vapor and gas are removed from the vapor dome 500 through an outlet port 505. Within the vapor dome 500, there is an emergency relief port 503 that allows any accumulated liquids that have risen above the allowable liquid level to be discharged back into the system or externally blown down to a receiver tank. Instrumentation for monitoring temperature, pressure, flow rate, and other parameters is provided through instrumentation ports 506 and 507.

The mass rate of flows through the device 50 is controlled with external flow and pressure regulation stations that are supervised and monitored by conventional liquid level sensors, flow meters, and temperature and pressure sensors/regulators.

The method of separating a liquid-liquid-gas mixture of immiscible fluids involves the steps of introducing the mixture of immiscible fluids into a separator apparatus under pressure, heating the mixture, forcing the mixture through an elongated curvilinear flow path which includes reverse flow paths in order to cause the lower density liquid to rise and the higher density liquid to fall, collecting the lower density fluid from the top of the separator, and draining the higher density fluid from the bottom of the separator. The method also comprises bubbling evolved gases through the mixture, collecting the evolved gases, and maintaining a temperature gradient between the upper and lower portions of the separator.

It is to be understood that the present invention is not limited to the sole embodiments described above, but encompasses any and all embodiments within the scope of the following claims.

We claim:

1. A compound/curvilinear immiscible liquid separator, comprising:
   (a) a separator section having an outer, elongated, hollow cylindrical shell, said shell being vertically aligned and having a top end and a bottom end;
   (b) a center well column coaxial with and disposed within said shell, the column having a plurality of ports defined therein;
   (c) an inlet pipe extending through said cylindrical shell;
   (d) an inlet chamber defined between said shell and said center column;
   (e) a plurality of curved walls disposed between said shell and said center well column, said curved walls defining a continuous curvilinear laminar flow path having a plurality of reverse flow paths;
   (e) an oil outlet pipe having a first end coaxial with and disposed in said center column, said outlet pipe being adapted for attachment to an oil storage tank; and
   (f) a crude oil containment section disposed below said separator section;
   said separator section further includes:
   (i) a pathway closure panel extending radially between said center well column and said shell;
   (ii) a pathway inlet panel extending radially between said center well column and said shell, the inlet panel having a notch therein defining a pathway entrance channel between the inlet panel and said shell opening into said curvilinear laminar flow path, the pathway closure panel and the pathway inlet panel being disposed in half-planes forming an acute dihedral angle and an obtuse dihedral angle;
   (iii) an upper closure plate disposed across the top end of said shell and the acute dihedral angle formed between said pathway closure panel and said pathway inlet panel; and
   (iv) a lower closure plate disposed across the bottom end of said shell and the acute dihedral angle formed between said pathway closure panel and said pathway inlet panel;
   wherein said pathway closure panel, said pathway inlet panel said upper closure plate and said lower closure plate define an elongated, pie-shaped compartment; and
   wherein a mixture of immiscible fluids is introduced through said inlet pipe into the inlet chamber and circulated through said curvilinear flow path, whereby low density fluids rise in said center column and are discharged through said outlet pipe, and high density fluids fall into said containment section.

2. The compound/curvilinear immiscible liquid separator according to claim 1, wherein the acute dihedral angle defined by said pathway closure panel and said pathway inlet panel measures between 30° and 60°.

3. The compound/curvilinear immiscible liquid separator according to claim 1, wherein said inlet chamber is defined by said elongated, pie-shaped compartment.

4. The compound/curvilinear immiscible liquid separator according to claim 3, further comprising an upper inlet flow control plate disposed transversely in said inlet chamber and extending from said shell towards said center well column, the upper inlet flow control plate dividing said inlet chamber into a lower inlet chamber and an upper heating chamber.

5. The compound/curvilinear immiscible liquid separator according to claim 4, further comprising heating means disposed in said heating chamber for heating an immiscible fluid before the fluid enters said curvilinear laminar flow path.

6. The compound/curvilinear immiscible liquid separator according to claim 1, wherein said plurality of curved walls are disposed within the obtuse dihedral angle defined by said pathway closure panel and said pathway inlet panel.

7. The compound/curvilinear immiscible liquid separator according to claim 6, wherein said obtuse dihedral angle measures between 300° and 330°.

8. The compound/curvilinear immiscible liquid separator according to claim 6, wherein said curvilinear laminar flow path has a width-to-height ratio of between 1:60 and 1:240.

9. The compound/curvilinear immiscible liquid separator according to claim 6, wherein said plurality of curved walls extend between said upper closure plate and said lower closure plate, said curved walls being alternately attached to said pathway closure panel and said pathway inlet panel, respectively, in order to define said continuous curvilinear laminar flow path having a plurality of reverse flow paths.

10. The compound/curvilinear immiscible liquid separator according to claim 1, further comprising a lower transition section disposed between said separator section and said crude oil containment section, wherein:
   (a) said center well column further comprises a lower extension extending into said lower transition section;
   (b) said lower transition section further comprises a flow control cone disposed about said center well column, the flow control cone having a cylindrical skirt depending therefrom; and
   (c) said crude oil containment section further comprises:
      (i) a lower well ring attached to and extending the cylindrical skirt of said flow control cone, the well ring having a lower end; and
      (ii) a circular perforated plate disposed across the lower end of said lower well ring; whereby an immiscible fluid having a more dense portion and a less dense portion drops from said separator section and is separated by sliding down said flow control cone, the more dense portion settling into said crude oil containment section, the less dense portion rising through said perforated plate and into said center well column.

11. The compound/curvilinear immiscible liquid separator according to claim 1, further comprising a first heating means disposed in said separator section and a second heating means disposed in said crude oil containment section for maintaining a temperature gradient between said separator section and said crude oil containment section.

12. The compound/curvilinear immiscible liquid separator according to claim 1, further comprising a float having a bristle ring disposed about the float, the float being disposed in said center well column, said float having a specific gravity adapted for maintaining separation of more dense from less dense liquids in said center well column.

13. The compound/curvilinear immiscible liquid separator according to claim 1, further comprising:
   (a) an upper transition section attached to the top end of said separator section, the upper transition section having a perforated plate disposed above said separator section; and
   (b) a vapor dome attached to said upper transition section, said vapor dome having:
      (i) an outlet port for removing vapors evolved during separation of immiscible fluids; and
      (ii) a counterrotating vane disposed between the perforated plate of said upper transition section and said outlet port for condensing liquids from the vapor and dropping the condensed liquids back into said separator section.

14. A compound/curvilinear immiscible liquid separator, comprising:
   (a) a separator section having an outer, elongated, hollow cylindrical shell;
   (b) a center well column coaxial with and disposed within said shell, the column having a plurality of ports defined therein;
   (c) an inlet pipe extending through said cylindrical shell;
   (d) an inlet chamber defined between said shell and said center column;
   (e) a plurality of curved walls disposed between said shell and said center well column, said curved walls defining a continuous curvilinear laminar flow path having a plurality of reverse flow paths;
   (e) an oil outlet pipe having a first end coaxial with and disposed in said center column, said outlet pipe being adapted for attachment to an oil storage tank;
   (f) a crude oil containment section disposed below said separator section; and
   (g) a lower transition section disposed between said separator section and said crude oil containment section, said center well column further comprising a lower extension extending into said lower transition section, said lower transition section further comprising a flow control cone disposed about said center well column, the flow control cone having a cylindrical skirt depending therefrom; and
   (h) said crude oil containment section further comprising:
      (i) a lower well ring attached to and extending the cylindrical skirt of said flow control cone, the well ring having a lower end; and
      (ii) a circular perforated plate disposed across the lower end of said lower well ring;
   wherein a mixture of immiscible fluids is introduced through said inlet pipe into the inlet chamber and circulated through said curvilinear flow path, a more dense portion and a less dense portion dropping from said separator section and being separated by sliding down said flow control cone, the more dense portion settling into said crude oil containment section, the less dense portion rising through said perforated plate and into said center well column and being discharged through said outlet pipe.

* * * * *